March 17, 1970  J. H. WILSON  3,500,708
AUTOMATED PIPE TONGS
Filed May 1, 1967  19 Sheets-Sheet 5
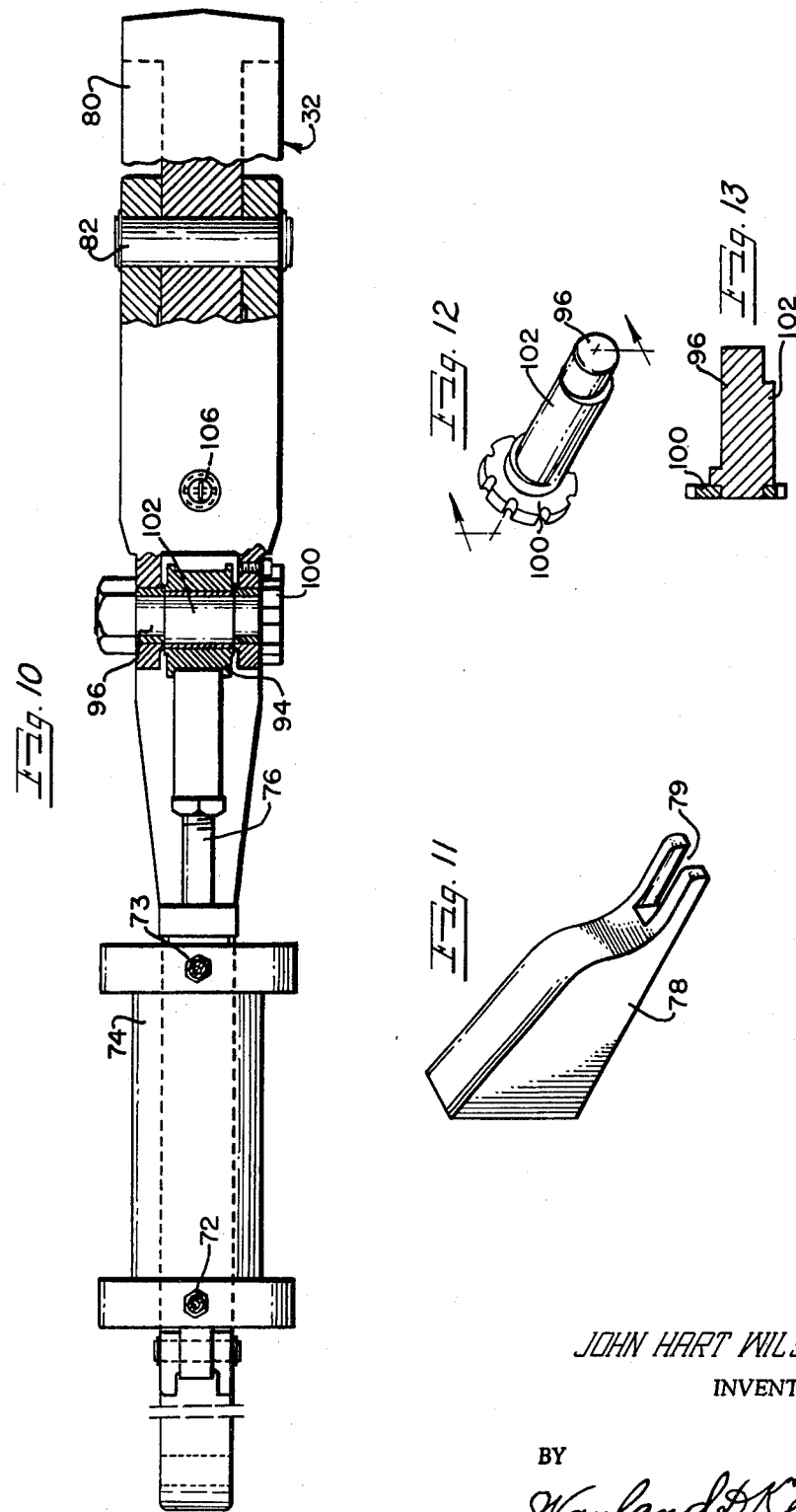
JOHN HART WILSON
INVENTOR.
BY
Wayland D. Keith
HIS AGENT

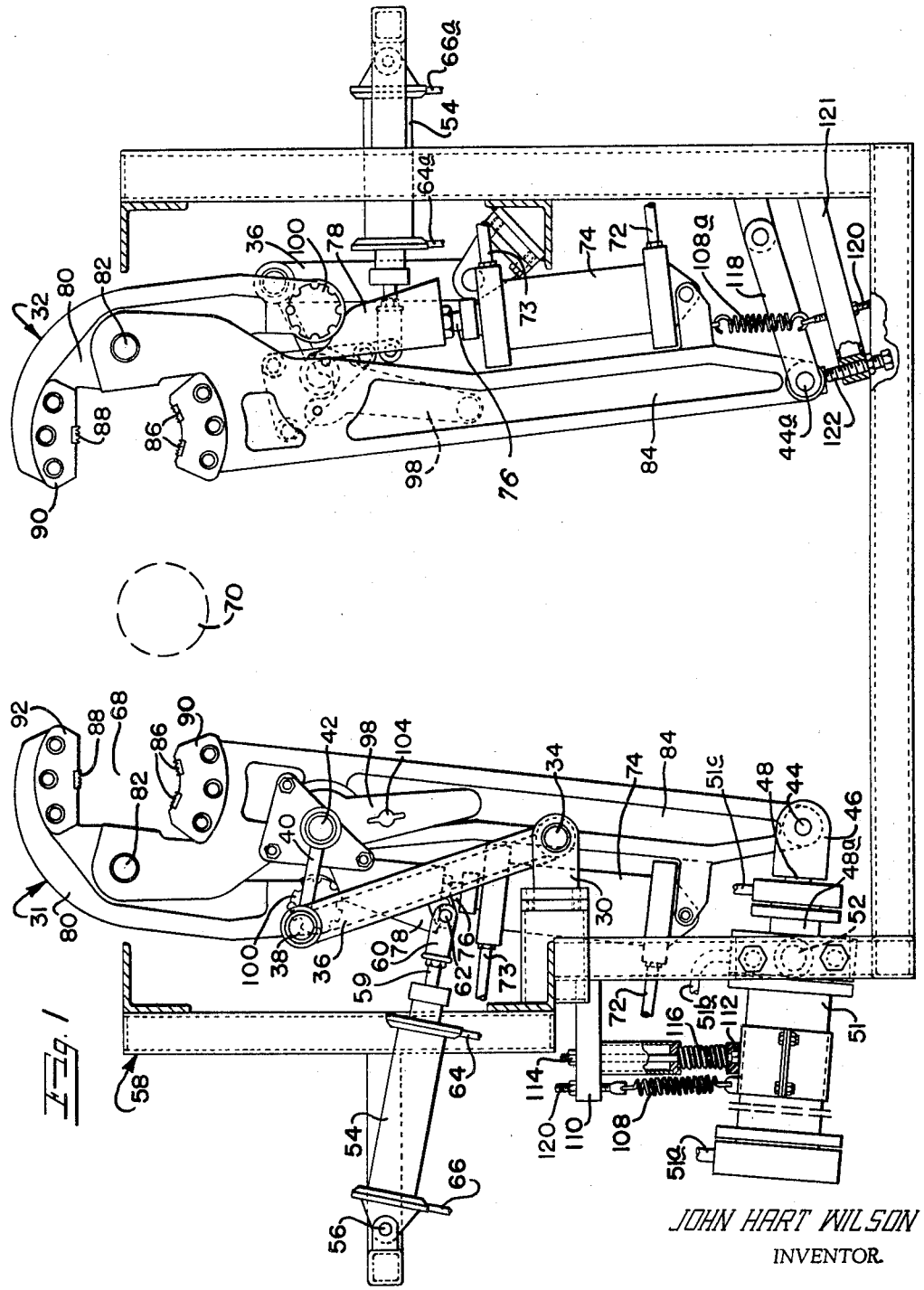

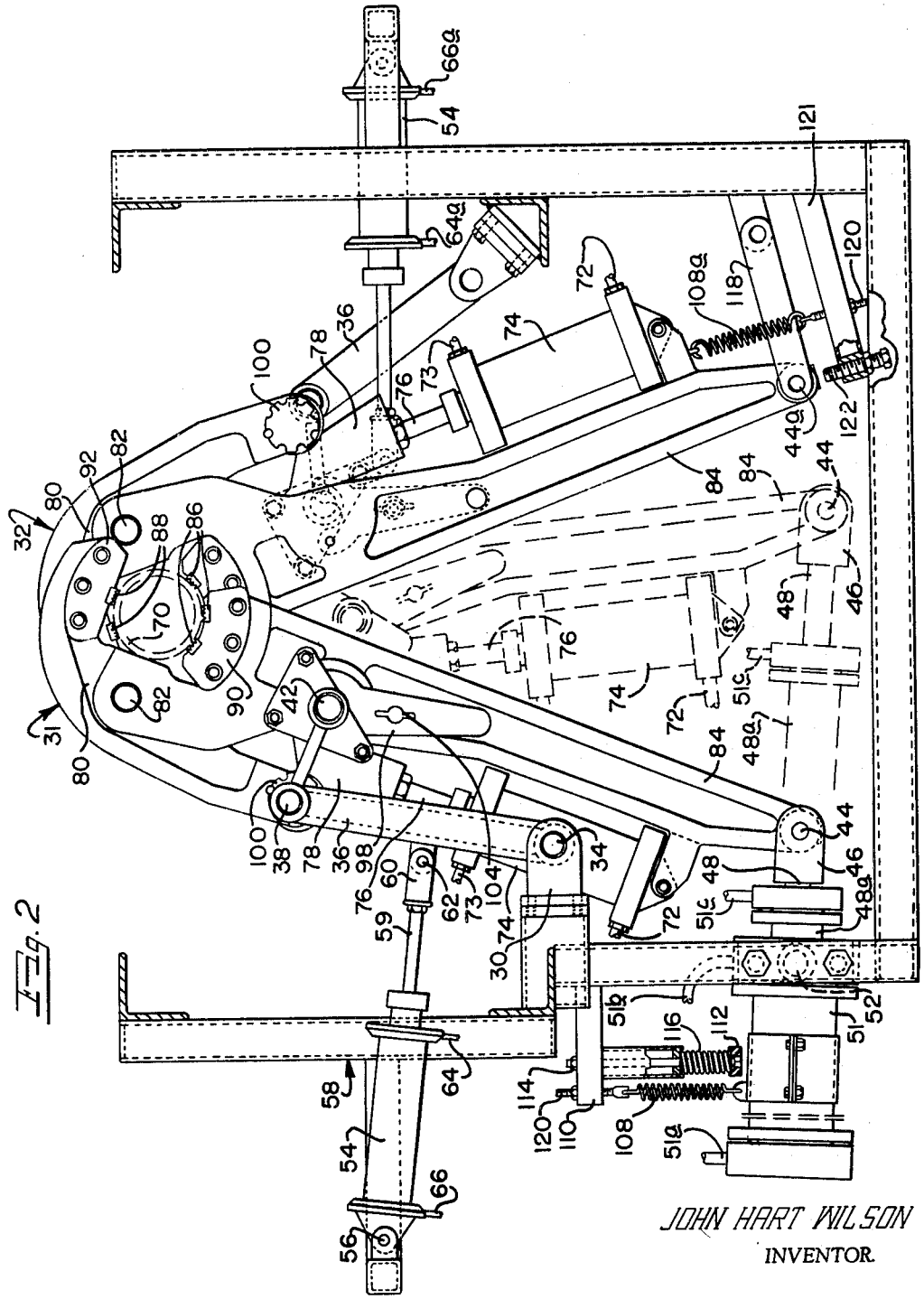

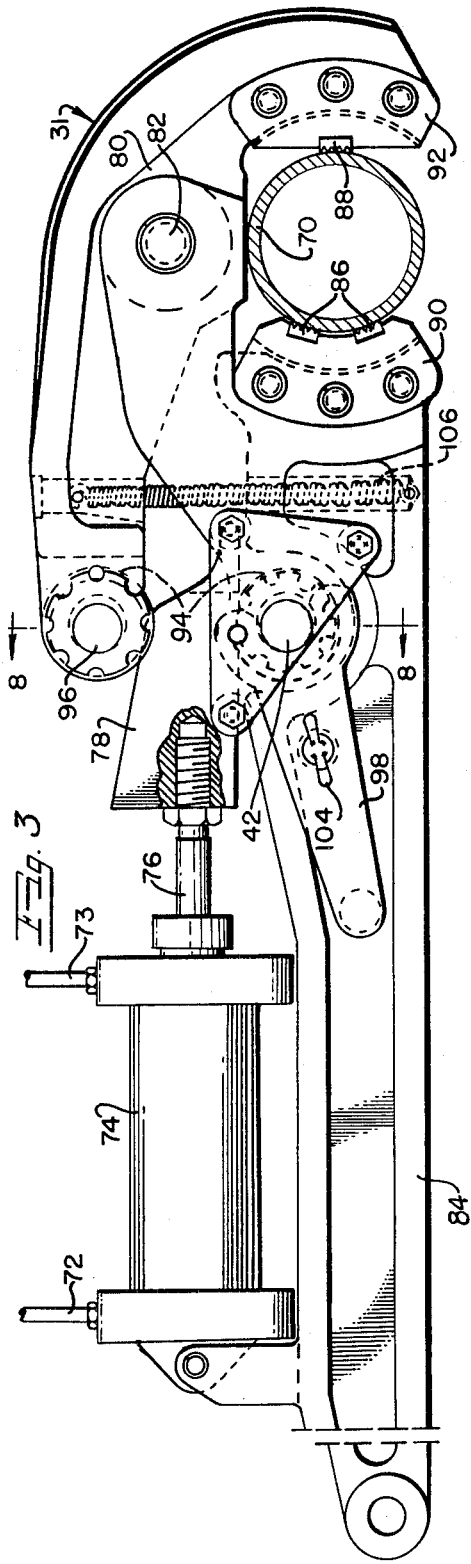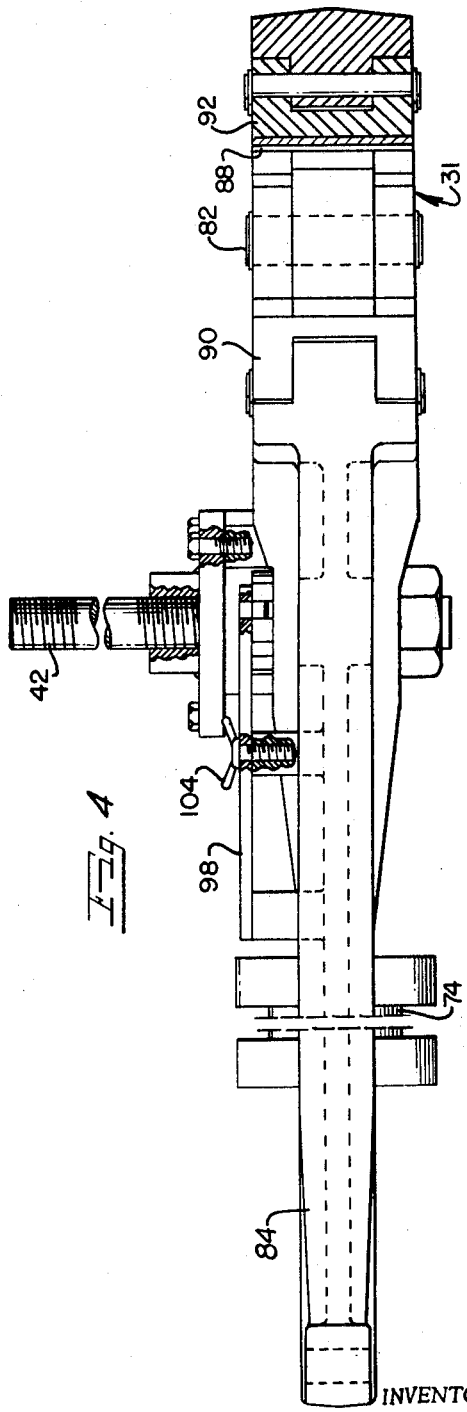

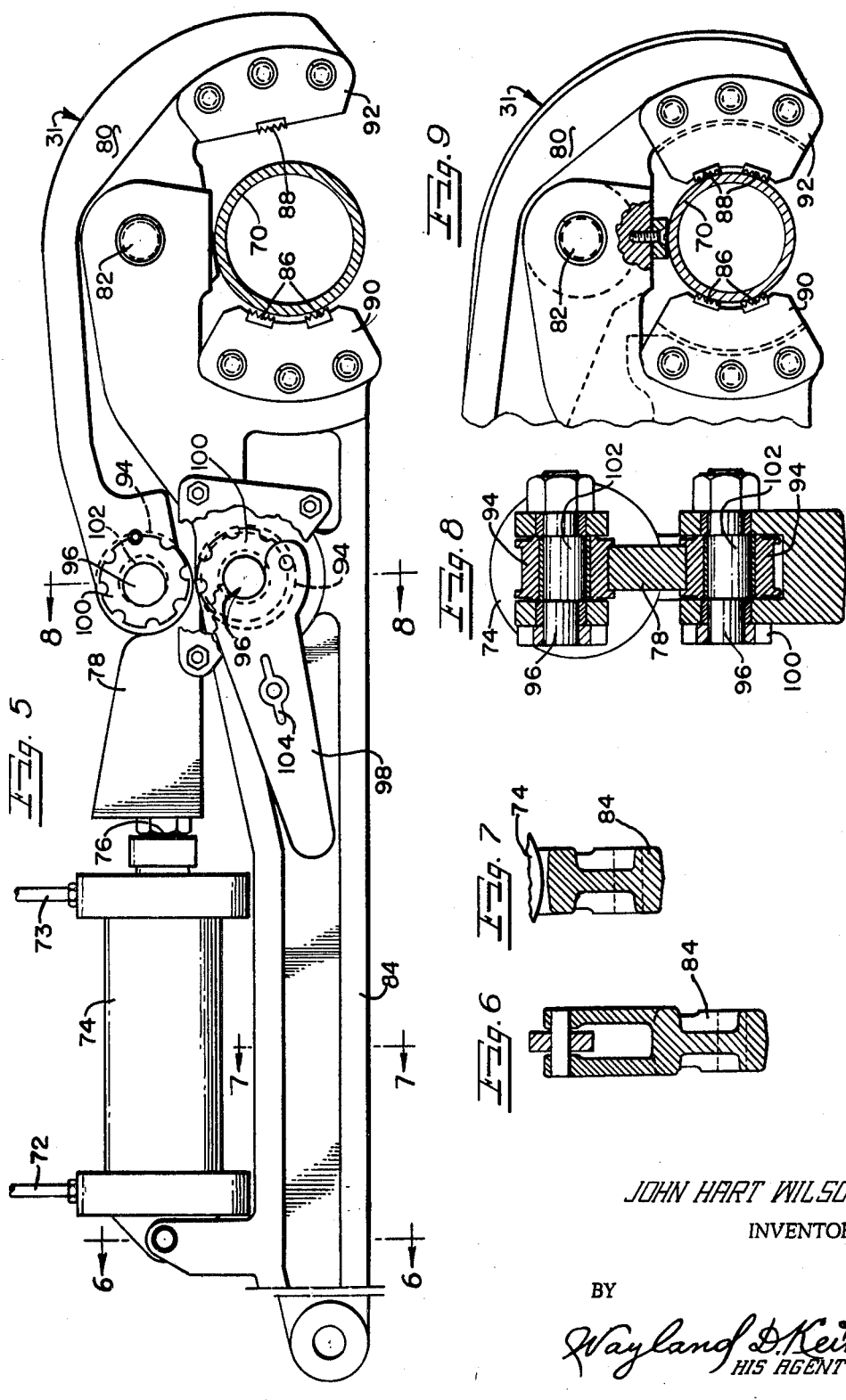

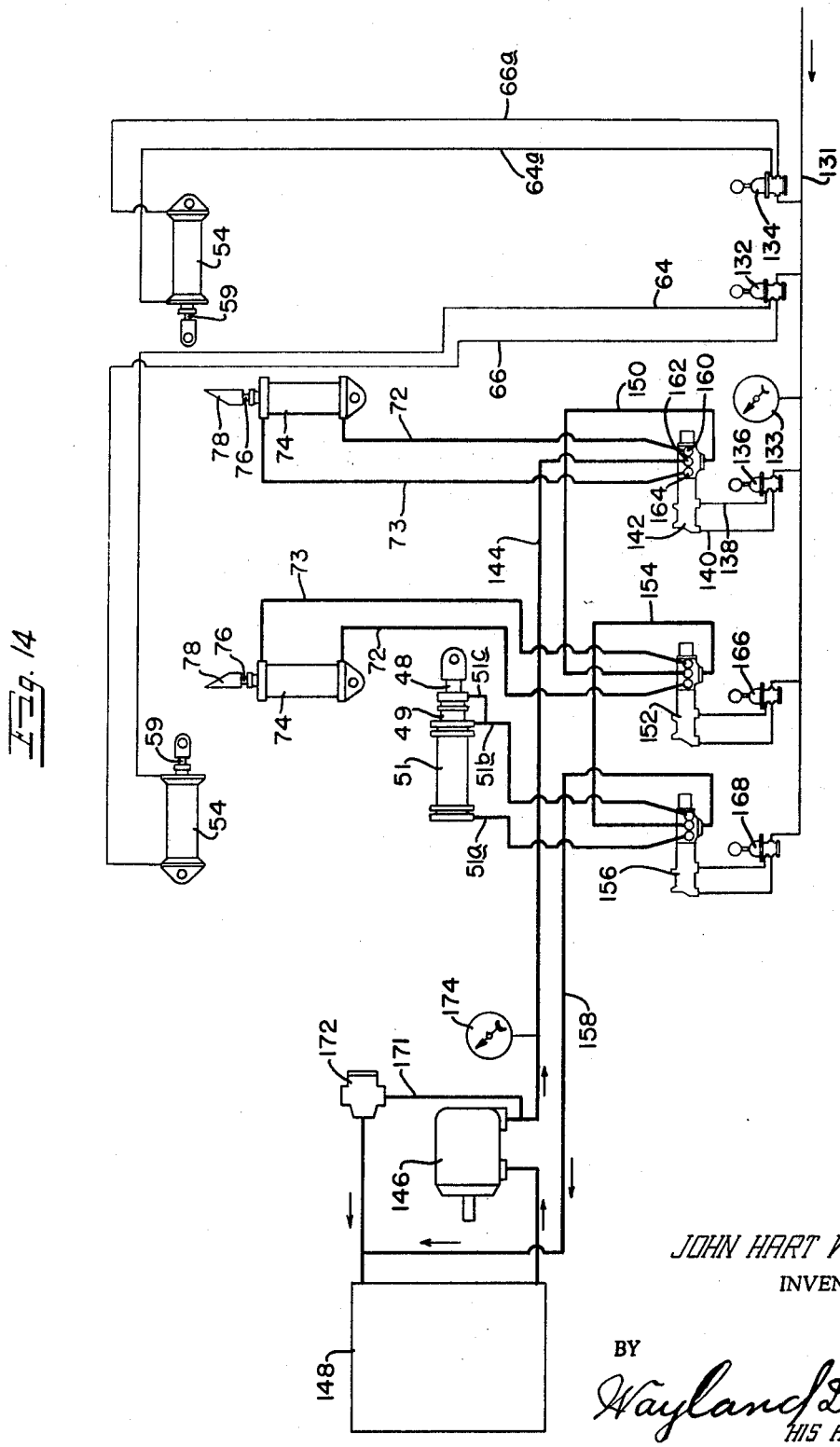

March 17, 1970   J. H. WILSON   3,500,708
AUTOMATED PIPE TONGS
Filed May 1, 1967   19 Sheets-Sheet 7
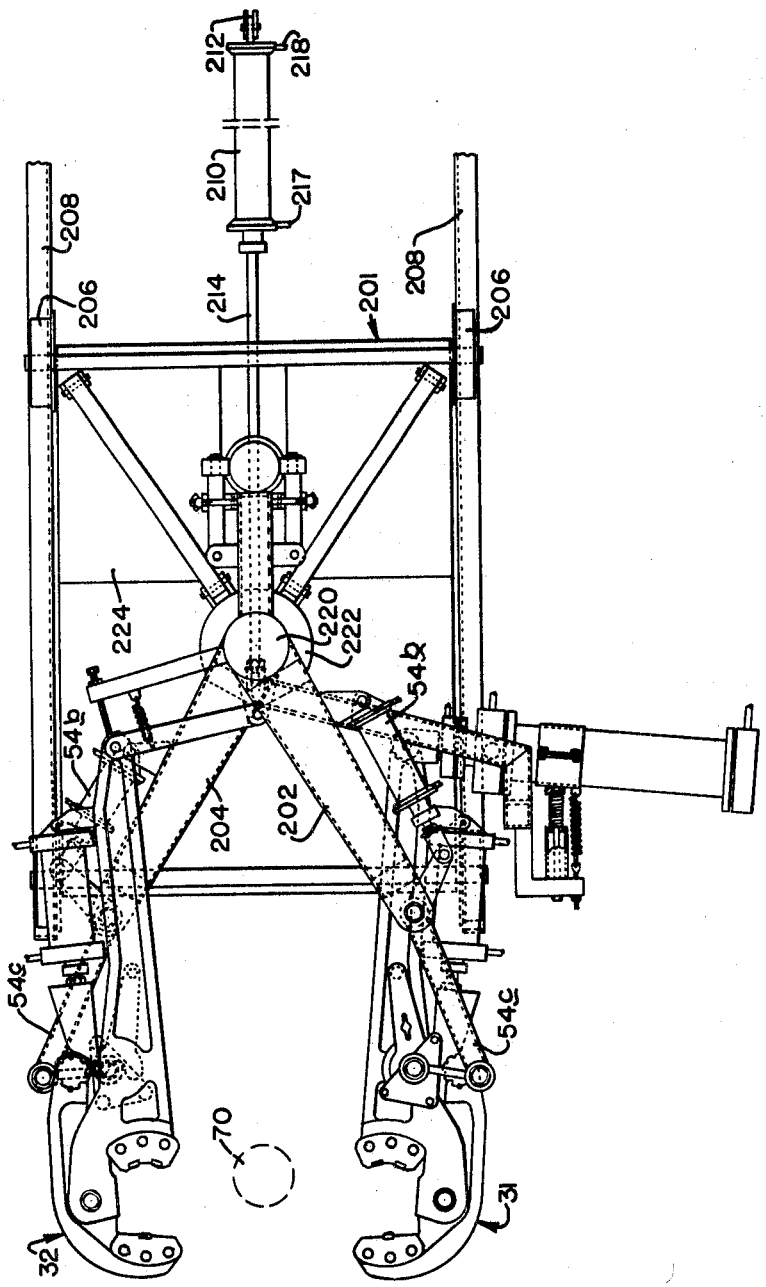
JOHN HART WILSON
INVENTOR.
BY
Wayland D. Keith
HIS AGENT

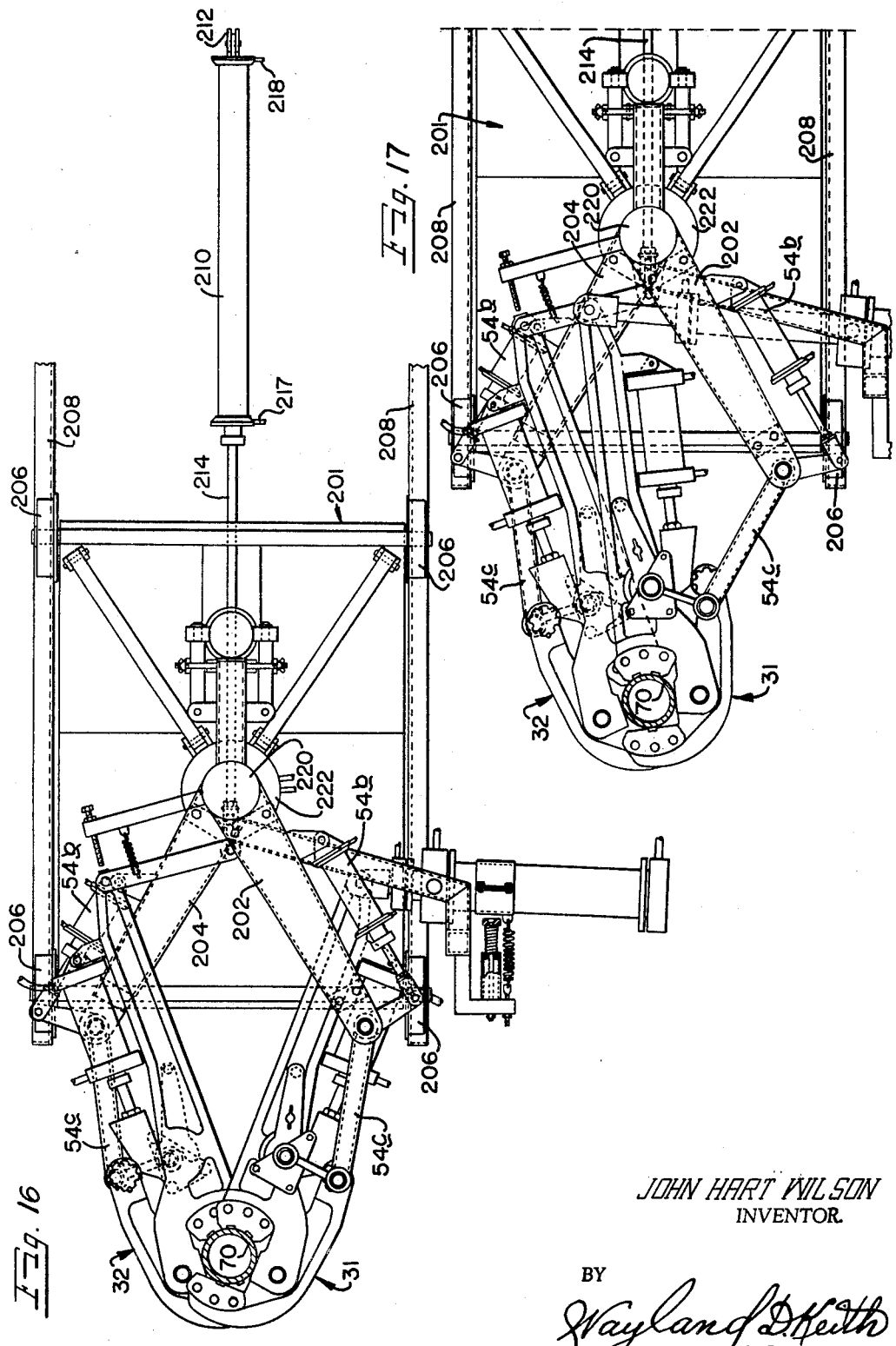

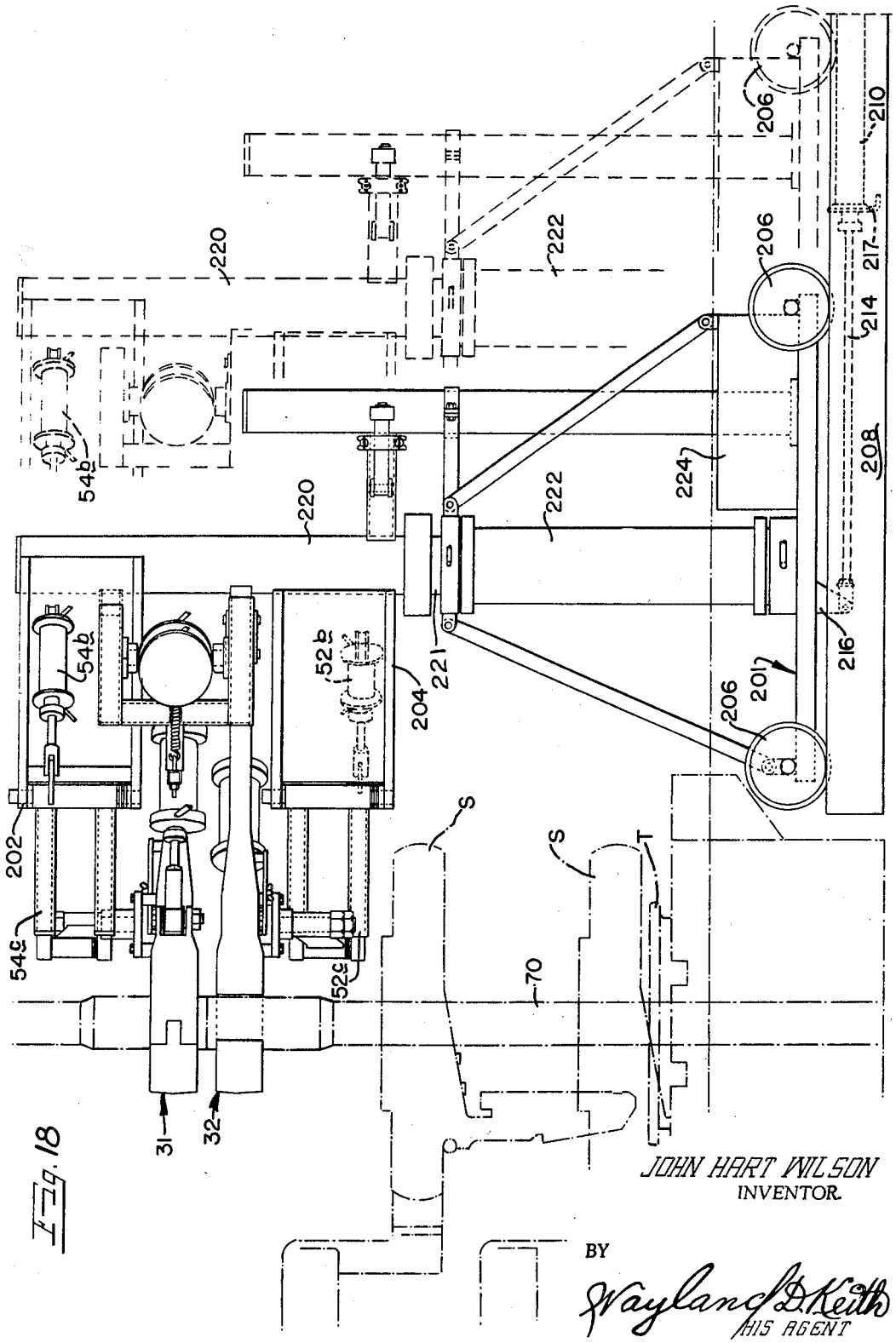

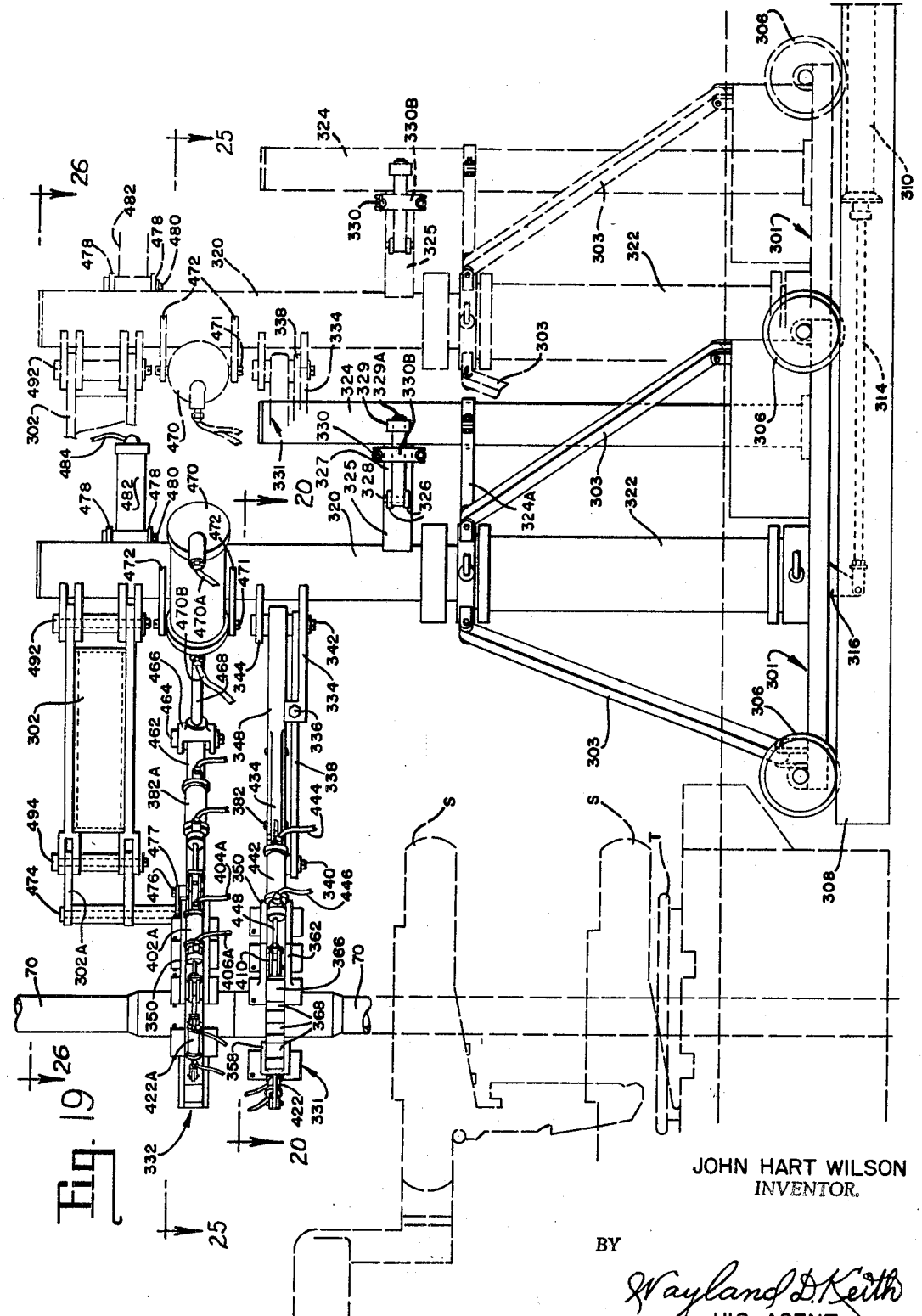

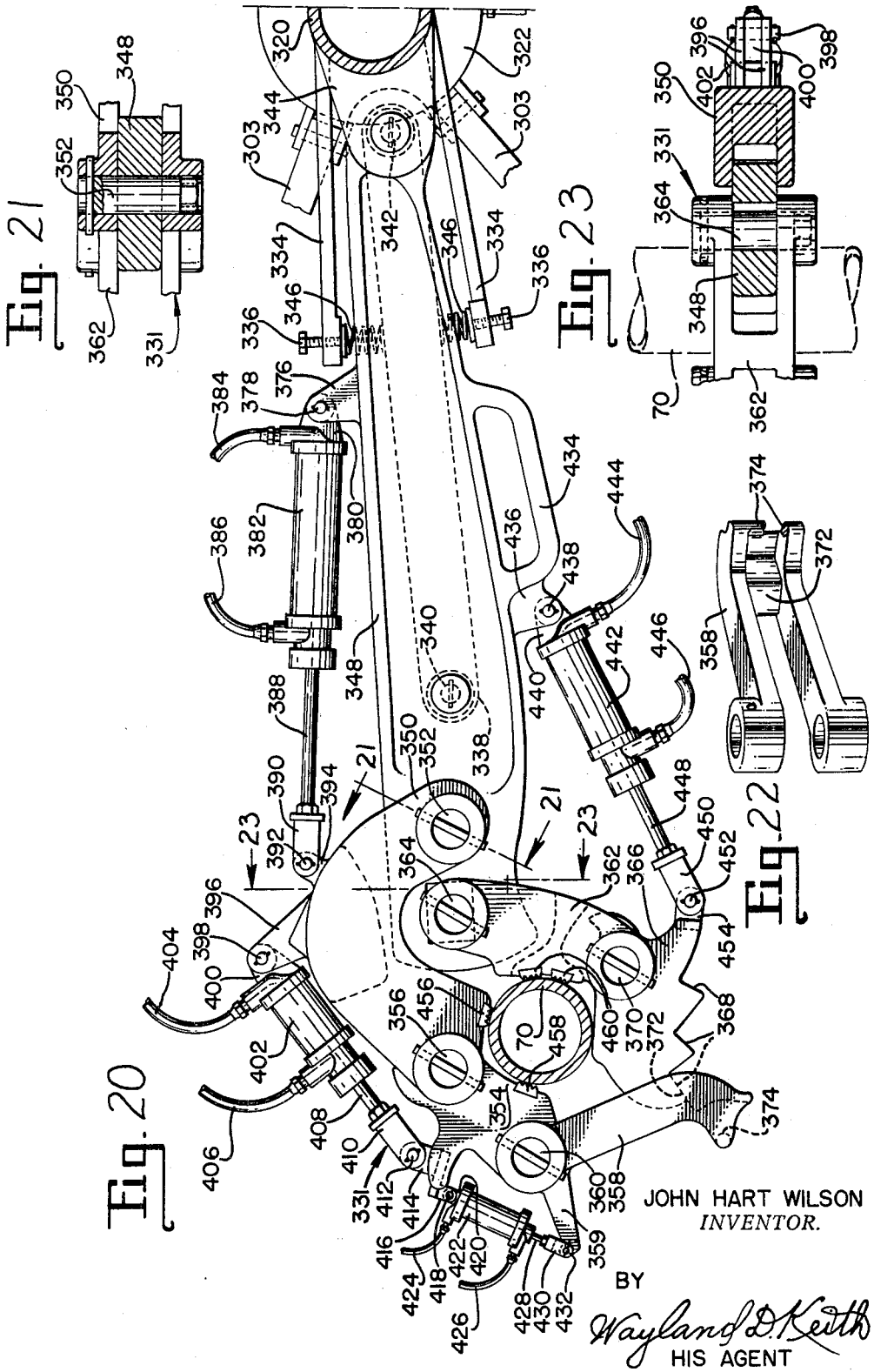

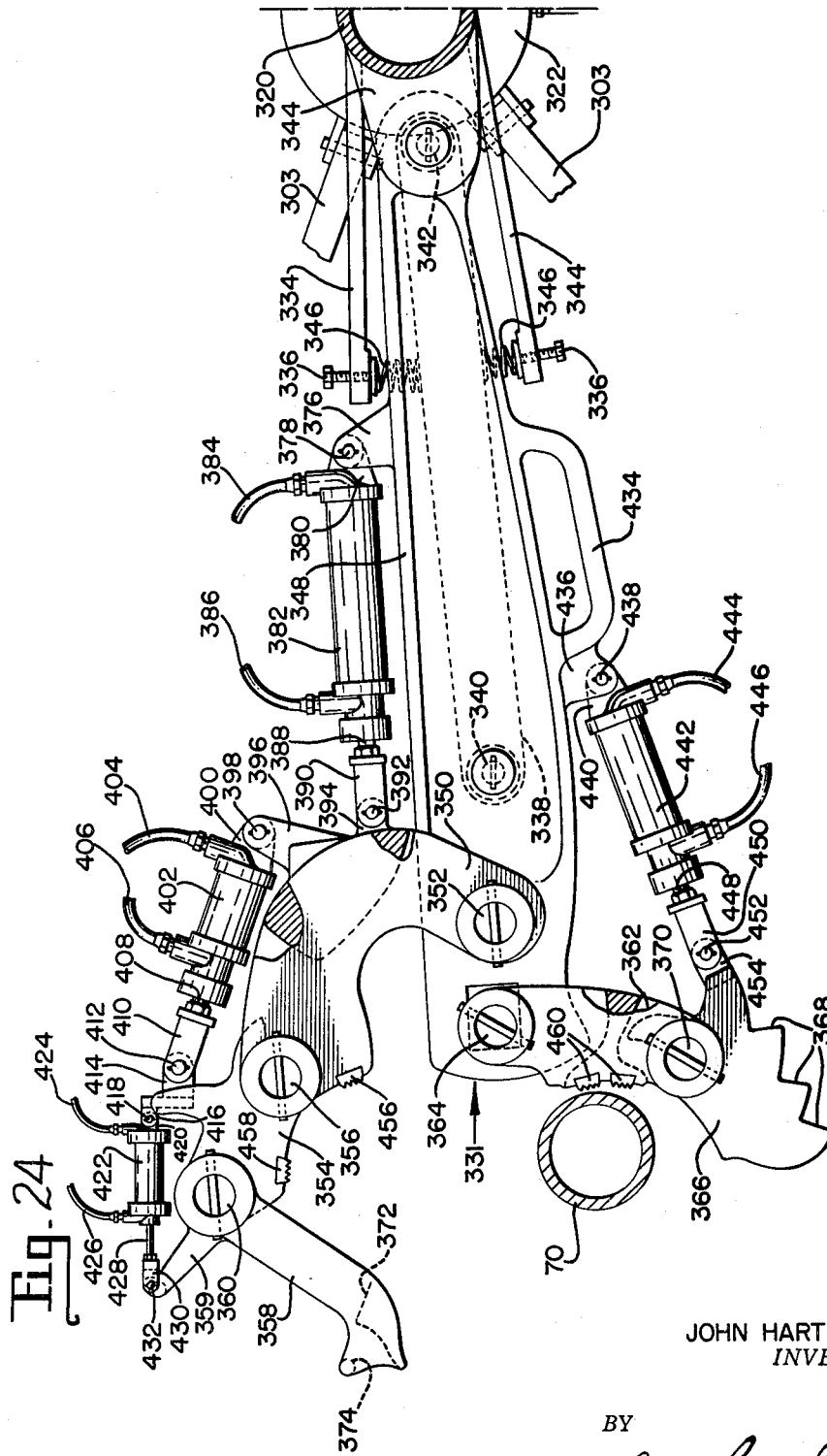

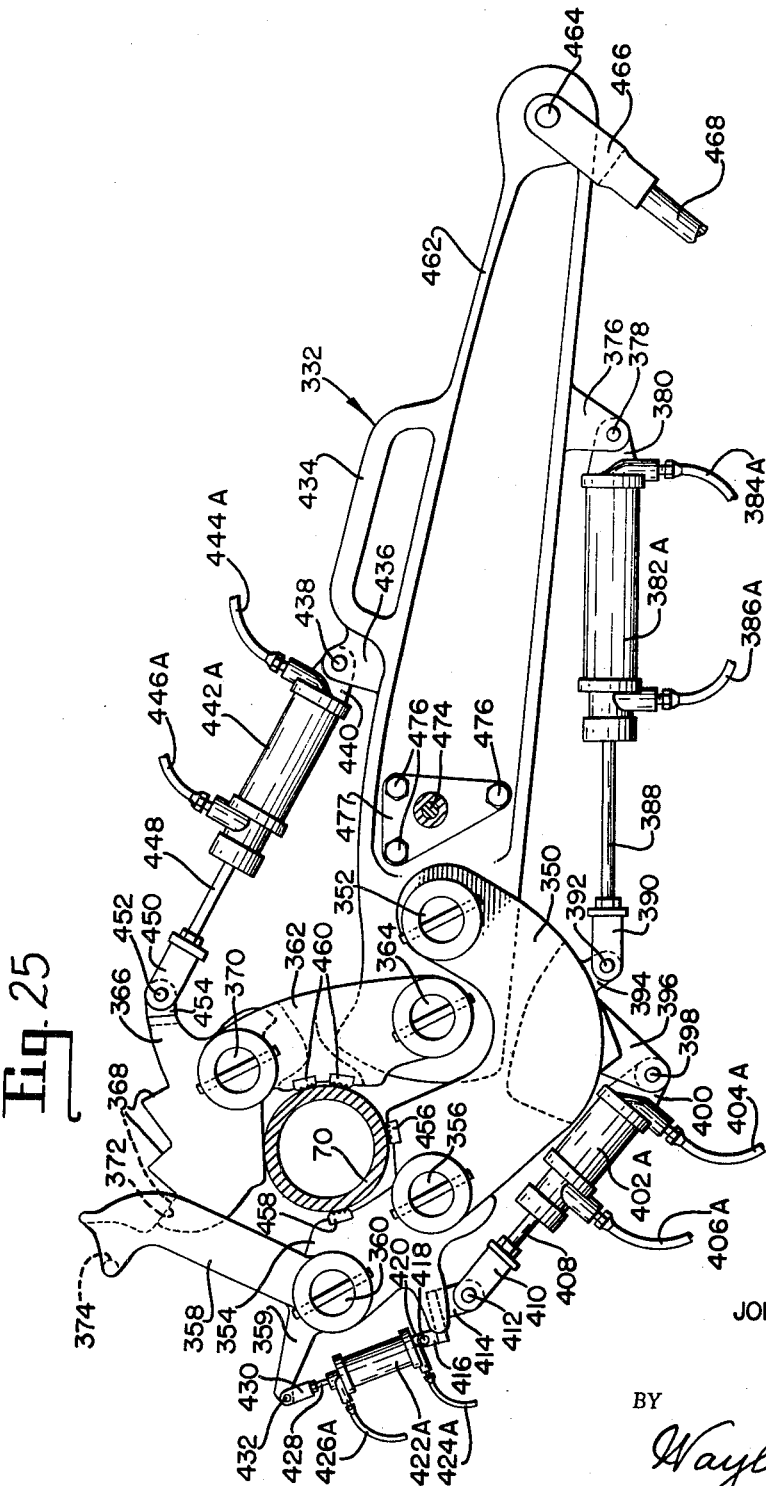

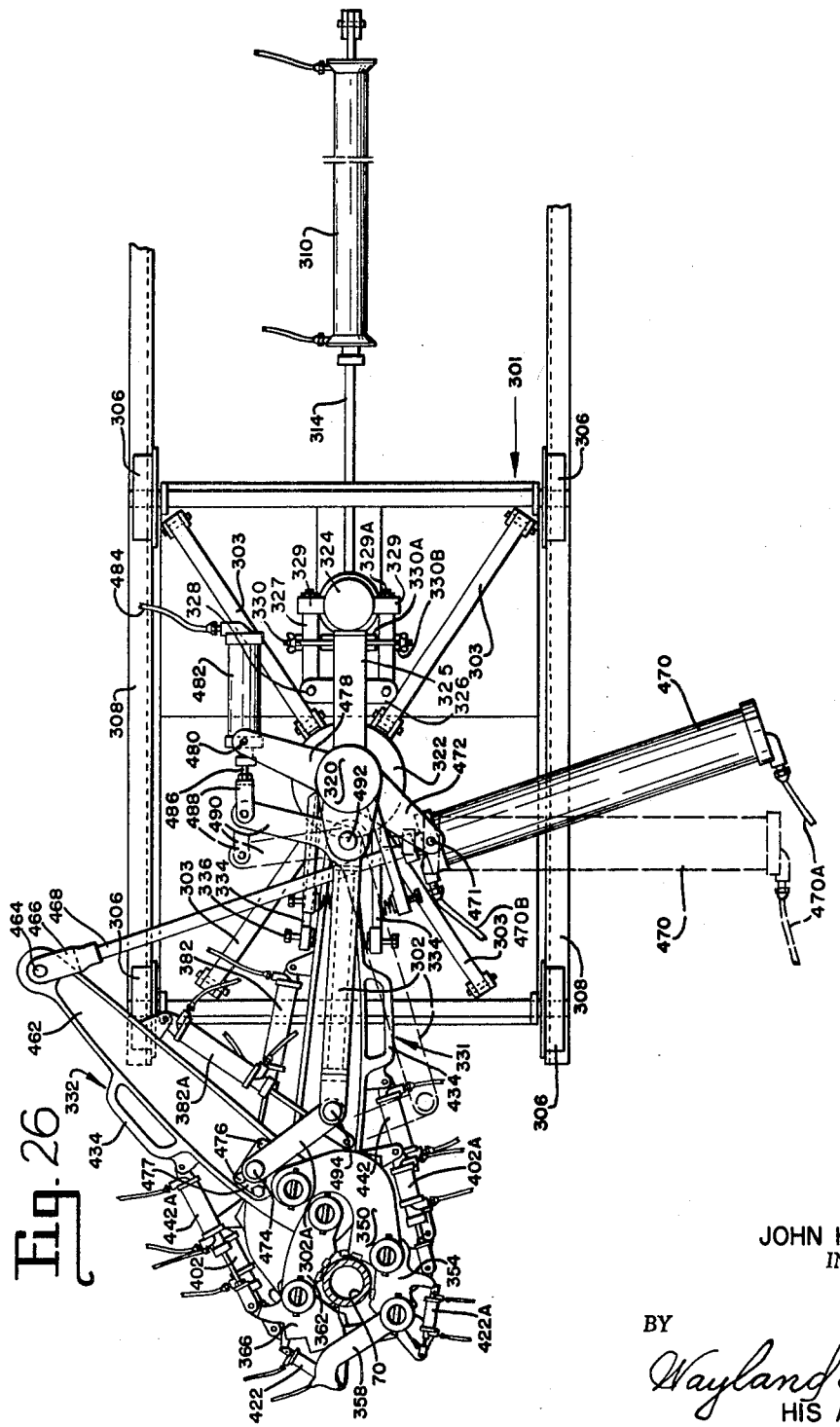

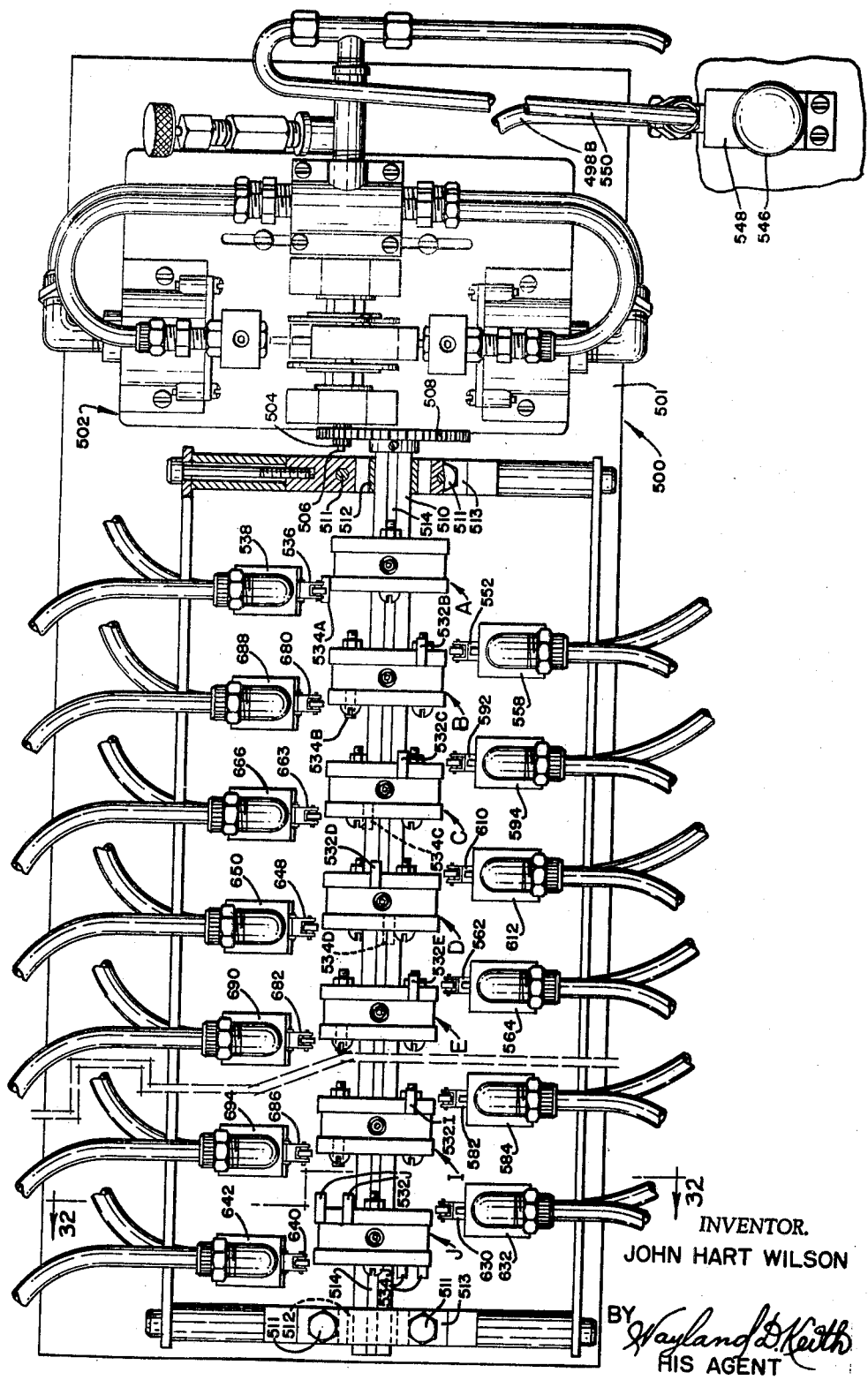

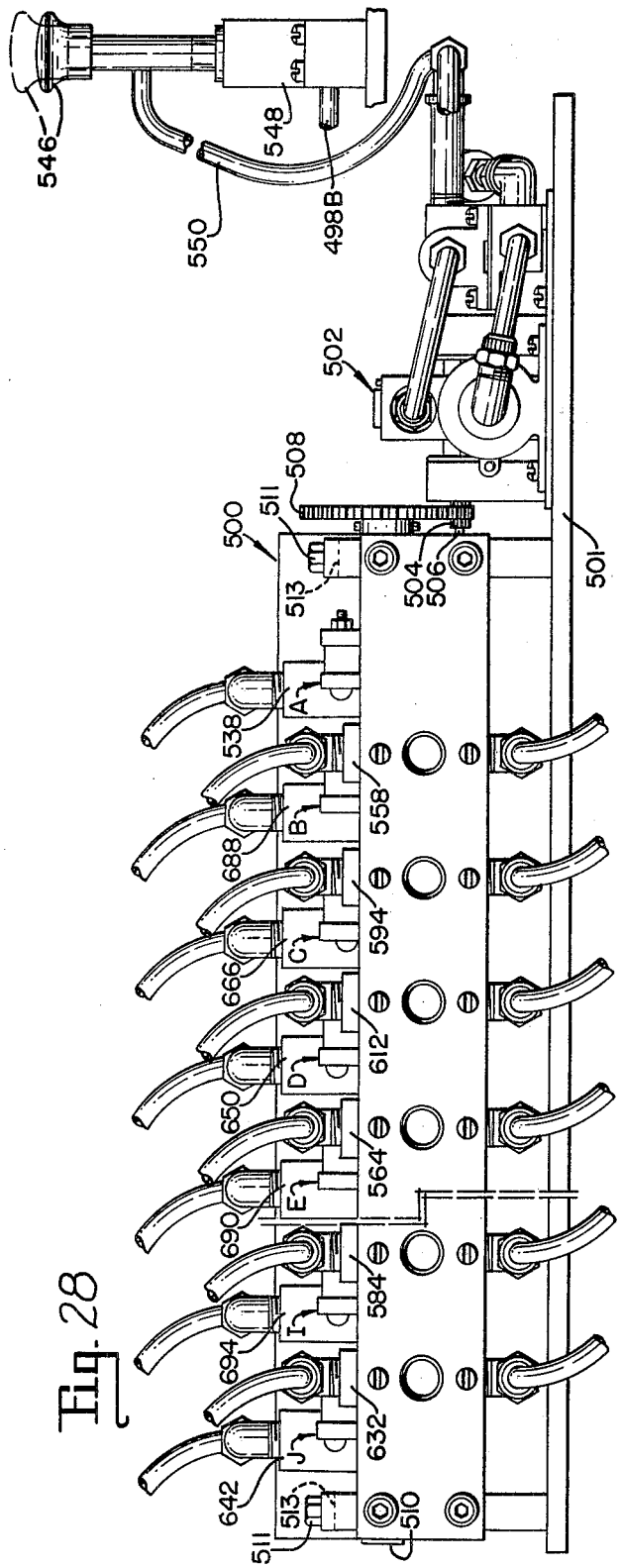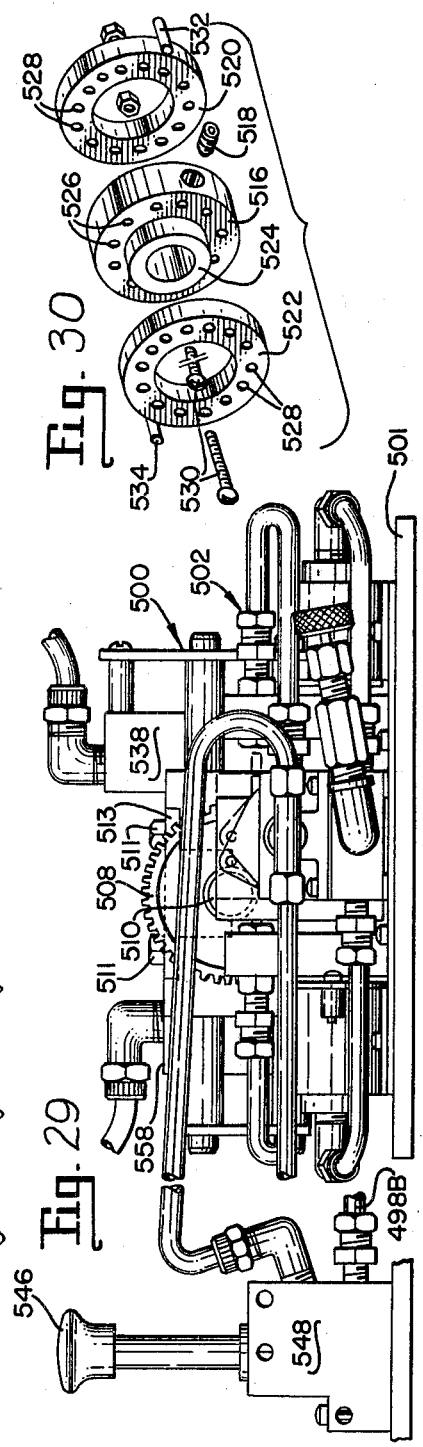

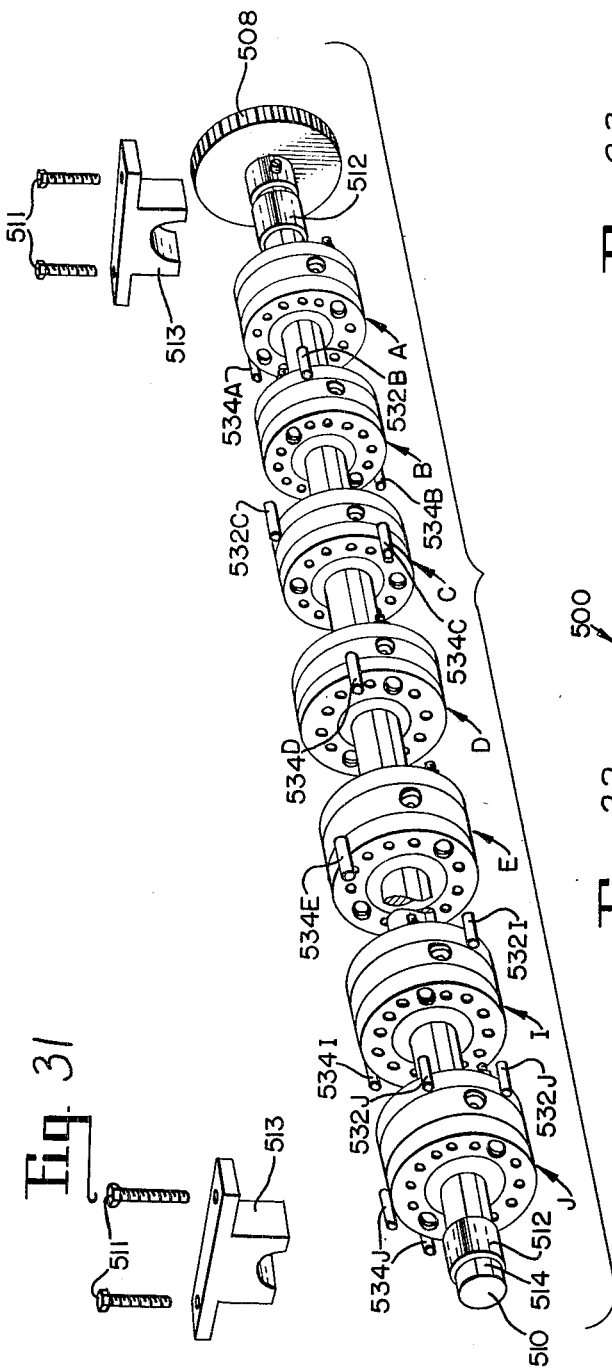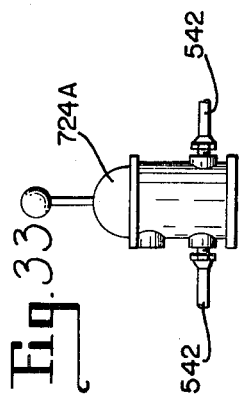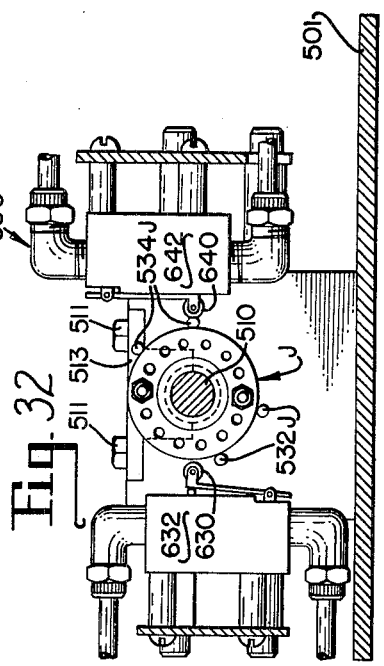
JOHN HART WILSON
INVENTOR.

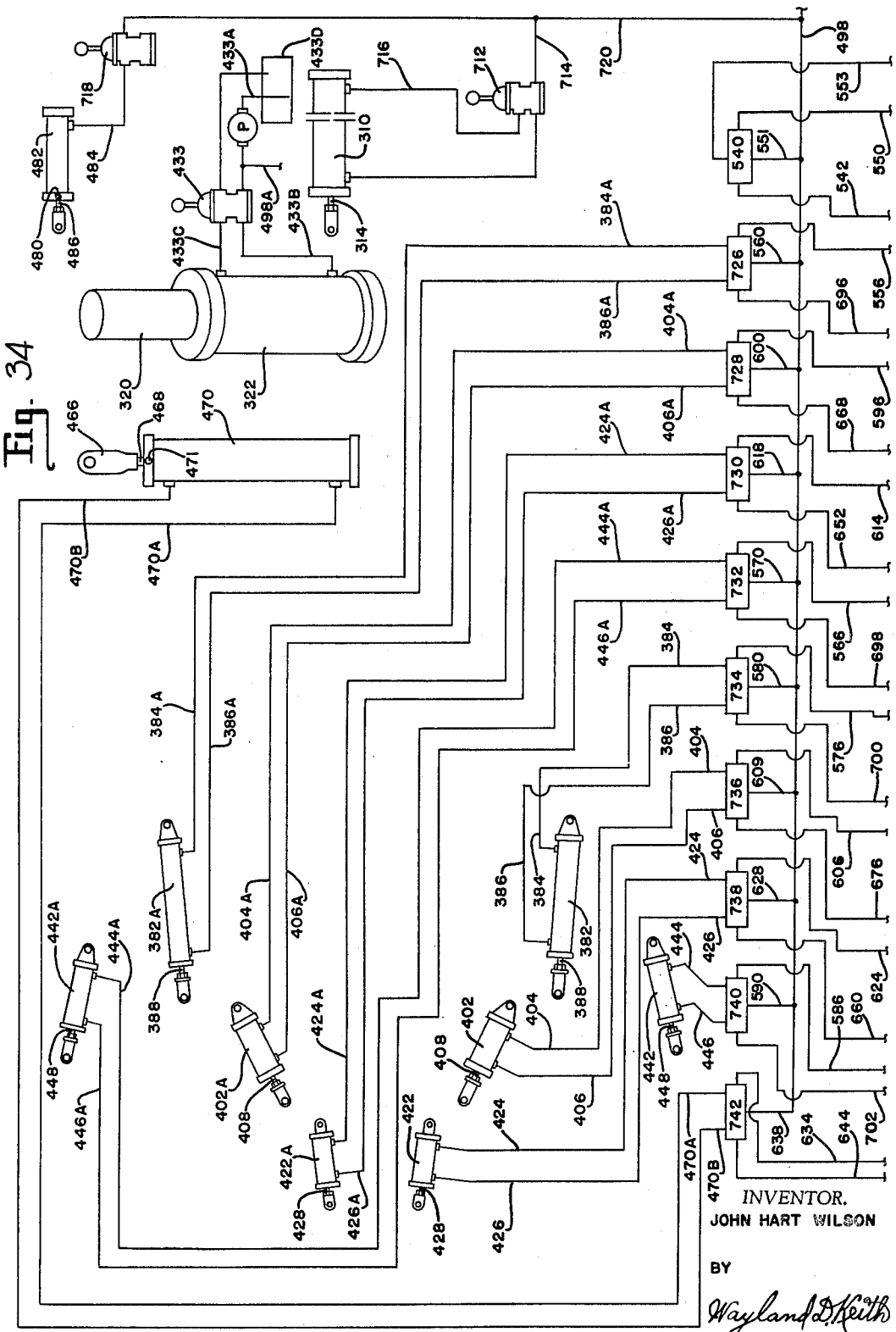

March 17, 1970 J. H. WILSON 3,500,708
AUTOMATED PIPE TONGS
Filed May 1, 1967 19 Sheets-Sheet 19

JOHN HART WILSON
INVENTOR.

BY
Wayland D. Keith
HIS AGENT

United States Patent Office 3,500,708
Patented Mar. 17, 1970

3,500,708
AUTOMATED PIPE TONGS
John Hart Wilson, c/o Wilson Manufacturing Company, P.O. Box 1031, Wichita Falls, Tex. 76307
Continuation-in-part of application Ser. No. 434,745, Feb. 19, 1965. This application May 1, 1967, Ser. No. 634,976
Int. Cl. B25b 13/50
U.S. Cl. 81—57.34
10 Claims

ABSTRACT OF THE DISCLOSURE

Automated pipe tongs for making up or breaking out drill stem or pipe, such as used in conjunction with a drilling rig, which tongs are moved into and away from operating position on a wheeled carrier. The various operations of tongs are actuated by fluid cylinders, which fluid cylinders are programmed by a rotary cam programming control mechanism, to cause sequential action of certain cylinders, both for the opening and for closing the tongs and for moving the handle of one of the tongs arcuately to make up or break out drill stem or pipe. Two or more cams may be programmed to operate simultaneously, with the same operations being repeated each time the programming mechanism makes one complete cycle. The present programming device is so constructed as to stop when one cycle is completed. Provisions are made for stopping the programming mechanism at any point within the cycle and for manually operating valves to perform any phase of the operation. Further valves are provided to selectively render any portion of the operation inoperative. Further provisions are made to enable the entire programmed cam shaft to be removed and another programmed cam shaft installed to perform different operations.

---

This application is a continuation-in-part of application Ser. No. 434,745, filed Feb. 19, 1965 for Pipe Tongs.

This invention relates to pipe tongs to be used for gripping pipe to enable pipe to be screwed together or unscrewed, and more particularly to power actuated pipe tongs which may be remotely controlled so the individual operating the tongs is relieved of opening and closing the tongs, of engaging the tongs on the pipe and of removing the tongs therefrom, as well as of moving the lever of the tongs arcuately about the axis of the pipe when the tongs are engaged on the pipe.

Various tongs have been provided heretofore which are operated both manually and by power, however, for the most part, these tongs had to be manually controlled to engage the pipe and manually swung out of engagement when the pipe was sufficiently tightened.

The present tongs are so constructed that a single operator may operate both the tongs to enable "automatic" or mechanical engagement thereof with the pipe, from a non-operating position to an operating position, and then, after the tongs are in position to engage the pipe, power is used to close the tongs in gripping relation around the pipe. Furthermore, the apparatus for handling the tongs is actuated by fluid power, which rotates the pipe in either direction as desired, while the back-up tong is maintained in engaged gripping relation with a complementary joint of pipe so as to enable the entire work to be performed by remote control, and without danger to the workmen, as has been the case heretofore, in most instances, in the use of power actuated tongs.

The present tongs are used primarily in combination with a derrick, mast or the like, however, they are subject to adaptation to any phase of screwing together or unscrewing pipe, merely by changing the mounting to accommodate the particular pipe screwing up or unscrewing job to be done. The present tong is primarily used with drill pipe in the drilling of oil wells, which pipe consists of threaded joints, to enable the coupling of lengths of pipe together in the form of a drill stem, which may extend several hundred or several thousand feet into the earth strata to perform the operation of drilling an oil well by the rotary drilling method. In performing this drilling operation, it is desirable to have all pipe joints tightened securely and accurately, but not tightened to such extent as to cause the threads to gall or to strip.

An object of this invention is to provide power actuated tongs which may be swung into place around axially aligned lengths of pipe to enable the making up or breaking out of the threaded joints connecting lengths of pipe in end-to-end relation.

Another object of this invention is to provide a power actuated tong in which all control operations may be performed from a remote station, to enable the tongs to be guided onto the pipe, so as to surround lengths of axially aligned pipe to screw the pipe together, or to unscrew the lengths of pipe without manual assistance from the operator.

Still another object of the invention is to provide a tonging system for operating a pair of tongs from a remote position.

Still another object of the invention is to provide a power actuated tong for gripping lengths of pipe to be screwed together, wherein a cam and lever, operated under fluid pressure, closes the jaws of the tongs around the pipe in gripping relation to give a mechanical advantage.

Still another object of the invention is to provide a side opening tong which may be moved onto or off of a pipe from a side thereof without the necessity of having to draw the pipe through the tong.

Still another object of the invention is to provide a suspension system for a pair of tongs, whereby they can be moved into or out of engagement with a pair of axially aligned lengths of pipe in the same path each time the tongs are positioned thereon, thereby making it unnecessary for manual guidance of the tongs into the correct position.

Still another object of the invention is to provide a power actuated tong which may be readily regulated to take care of worn pipe or pipe of different diameters.

Still a further object of the invention is to provide tong adjustment means to enable the attachment of the tongs to the pipe in such manner as to swing the tongs into place around axially aligned lengths of pipe in the same relation each time.

Still another object of the invention is to provide fluid power actuated cylinder means to rotate at least one of the tongs through an arcuate travel each time the fluid actuated cylinder plunger is reciprocated.

Still another object of the invention is to provide a fluid control system for controlling the thrust exerted by the respective fluid actuated cylinders so as to prevent crushing of the pipe or twisting the pipe in two.

Still a further object of the invention is to provide a tong mounting system to enable the tongs to be moved into engagement with a pair of axially aligned lengths of pipe and be moved out of engagement with the pipe and out of the work area when the screwing or unscrewing operation has been performed.

Yet another object of the invention is to provide means consisting of a hydraulic relief valve which can be set at a pressure so as to by-pass the hydraulic fluid at a predetermined pressure which will enable each screw-threaded coupling joint to be tightened to the same degree.

A further object of the invention is to provide an automated programming arrangement to cause pipe tongs to automatically engage drill stem or pipe and to actuate the tongs for a predetermined period and to automatically unlatch the tongs.

Still another object of the invention is to provide a fluid cylinder arrangement to selectively close pipe tongs and to selectively open pipe tongs, without danger to the person of the operator.

Yet another object of the invention is to provide a suspension system for tongs, which will permit the tongs to be moved into position around drill stem or pipe, from a place remote from the tongs.

Yet a further object of the invention is to provide an adjustable, resiliently mounted back-up tong and a suspended, freely maneuverable, automatically operated power tong.

A still further object of the invention is to provide a programming mechanism for an automated, power actuated tong, whereby a pre-programed cam assembly may be fitted into the motor actuated programming mechanism, which will operate the tongs in accordance with a pre-programmed cam assembly.

Yet another object of the invention is to provide an automated pre-programming device for power tongs which is relatively simple in construction, easy to operate, and which is comparatively free of maintenance.

With these objects in view and others which will become manifest as the description proceeds, reference is to be had to the accompanying drawings in which like reference characters designate like parts in the several views thereof, in which:

FIG. 1 is a horizontal sectional view through a derrick or mast, showing a pair of power actuated tongs supported therein, with the tongs shown to be in non-operating or retracted position, with parts being broken away and parts being shortened, and with other parts being shown in section to bring out the details of construction, the position of the lengths of pipe to be operated upon being shown in dashed outline;

FIG. 2 is a view similar to FIG. 1, but showing the tongs in engaged position around lengths of axially aligned pipe and showing one of the tongs and power cylinder therefor in full outline, in one position, and in dashed outline in another position, to show the manner in which pipe is operated by the tongs;

FIG. 3 is an enlarged top plan view of one of the tongs, showing the tongs engaged around a length of pipe, with parts broken away and with parts shown in section;

FIG. 4 is a side elevational view of the tong, with parts broken away, with parts shown in section, and with parts shortened to bring out the details of construction;

FIG. 5 is a view similar to FIG. 3, but showing the tongs in open position;

FIG. 6 is a sectional view taken on line 6—6 of FIG 5, looking in the direction indicated by the arrows;

FIG. 7 is a sectional view of the handle, taken on line 7—7 of FIG. 5, looking in the direction indicated by the arrows;

FIG. 8 is a sectional view taken on line 8—8 of FIG. 3, looking in the direction indicated by the arrows, and showing a cam wedged between rollers;

FIG. 9 is a fragmentary view of an end portion of the tong, similar to the tong shown in FIG. 3, but showing an adapter block therein to center pipe of smaller diameter, and showing tong dies mounted therein to accommodate pipe of smaller diameter;

FIG. 10 is a side elevational view of the tong similar to that shown in FIG. 4, but showing the opposite side of the tong, and with portions of the tong being broken away and portions thereof being shown in section to bring out the details of construction;

FIG. 11 is a perspective view of the wedge cam which performs the jaw closing operation;

FIG. 12 is a perspective view of a cam shaft and cam adjusting head for adjusting the tong dies to worn pipe or to pipe of slightly different size;

FIG. 13 is a longitudinal, sectional view through the cam shaft, as shown in FIG. 12;

FIG. 14 is a diagrammatic view of the fluid pressure system and the fluid cylinders used to actuate the power actuated tongs;

Figure 35:
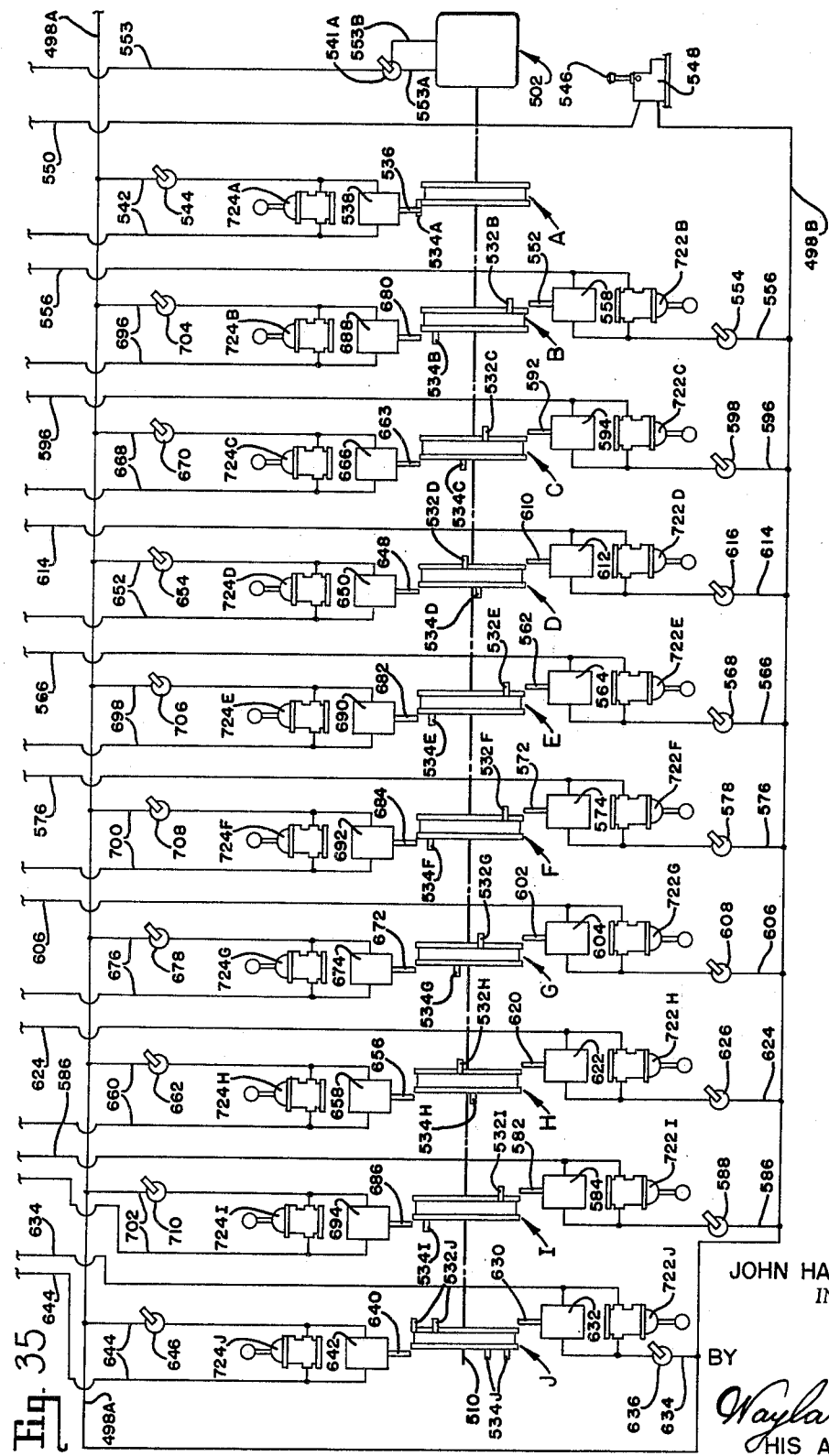

FIG. 15 is a top plan view showing a modified form of the invention, with the tongs in open position, preparatory to engagement with axially aligned lengths of pipe, on which a screwing operation is to be performed, showing the power actuated tongs mounted on a mobile carriage to enable the tong unit to be moved into and out of engagement with the pipe to be operated upon, and to enable the removal of the entire mobile carriage and tong unit, when the action has been performed;

FIG. 16 is a top plan view, similar to FIG. 15, the tongs being shown in engaged relation preparatory to unscrewing movement by one of the power actuated tongs;

FIG. 17 is a view similar to FIG. 16, but showing only a fragmentary portion thereof and showing the power actuated tong moved through an arc to perform a screwing operation upon a pipe;

FIG. 18 is a side elevational view of the tong mounting carriage and tongs, as shown in FIGS. 15 through 17, showing the tongs and carriage in full outline, with the tongs being positioned around axially aligned lengths of pipe, with the pipe, the pipe supporting slips and the rotary table being shown in dot-dash outline, and with the retracted position of the carriage supporting the tongs, being shown in dashed outline;

FIG. 19 is a side elevational view of a modified form of the invention, the tongs being shown in engaged position on drill stem, in full outline, and showing a pipe handling slip mechanism in dashed outline and showing the wheeled carriage in dashed outline;

FIG. 20 is a sectional view taken on the line 20—20 of FIG. 19, looking in the direction indicated by the arrows;

FIG. 21 is a sectional view taken on the line 21—21 of FIG. 20, looking in the direction indicated by the arrows;

FIG. 22 is a perspective view of a latch mechanism shown apart from the tongs;

FIG. 23 is a sectional view taken on the line 23—23 of FIG. 20, looking in the direction indicated by the arrows;

FIG. 24 is a view similar to FIG. 20, but showing the tong gripping jaws in open position;

FIG. 25 is a sectional view taken on the line 25—25 of FIG. 19, looking in the direction indicated by the arrows, with parts being broken away;

FIG. 26 is a sectional view taken on the line 26—26 of FIG. 19, looking in the direction indicated by the arrows, with parts broken away, and with parts shortened, with certain parts being shown in dashed outline moved to another position;

FIG. 27 is a top plan view of an air actuated programming mechanism, showing cams and pilot valves thereon, with the cams shown in position to actuate the pilot control valves; with parts being broken away, and with parts shortened;

FIG. 28 is a side elevational view of the air actuated programming mechanism as shown in FIG. 27, with parts broken away and with parts shortened;

FIG. 29 is an end elevational view of the air actuated programming mechanism as shown in FIG. 27, with parts being broken away and with parts being shortened;

FIG. 30 is an exploded sectional view of a cam hub, having shoulders thereon, and cam discs, having projections thereon, showing perforations in the cam discs and in the cam hub, with bolts to secure the cam members in fixed relation;

FIG. 31 is a perspective view of a programmed cam shaft shown apart from the air actuated programming mechanism;

FIG. 32 is a sectional view taken on the line 32—32 of FIG. 27, looking in the direction indicated by the arrows;

FIG. 33 is elevational view of a three-way, manually operated, control valve, which has off, on, and bleed positions; and FIG. 34 is a diagrammatic view of the piping and cylinder arrangement to actuate the present automated pipe tongs, and FIG. 35 is a diagrammatic view, complementary to FIG. 34, showing the programming mechanism and the piping.

With more detailed reference to the drawings, the form of the invention, as shown in FIGS. 1 through 14, discloses side opening tongs designated generally by the numerals 31 and 32, with the tong 32 being used as the gripping or back-up tong. The tong 31 is suspended from a mast or derrick 58 by a lug 30 having a support pin 34 thereon, which support pin journals one end of an arm 36 for arcuate movement therearound. The other end of arm 36 has a pin 38 therein to which a second arm 40 is pivoted. The arm 40 has a support bolt 42 secured thereto, which extends upward from tong 31 and is connected in secure relation to the tong to permit inward and outward swinging movement of tong 31 about pivot pin 44. The pivot pin 44 passes through clevis 46 on the plunger 48 of fluid cylinder 51. The fluid cylinder 51 is pivotally mounted on pivot 52 to compensate for arcuate movement as the plunger 48 moves inward and outward.

A second fluid actuated cylinder 54 is pivotally mounted on pin 56, which pin 56 is secured to mast or derrick 58. The other end of the fluid actuated cylinder 54 has a ram 59 extending outward therefrom and on which a clevis 60 is fitted, which clevis has a pin 62 therein. The pin 62 passes through an apertured lug on a side of tong 31, intermediate the length thereof, so upon directing fluid under pressure, into cylinder 54 through conduit 66, the open side of tong 31 will move into a position to engage pipe 70.

A third fluid actuated cylinder 74 is pivotally mounted on the handle portion 84 of the elongated body of tong 31 and has a plunger 76 extending outward therefrom on which cam means such as a wedge-shaped cam 78 is mounted. The wedge shaped cam 78 extends outward toward movable jaw 80, which jaw is pivotally mounted on body 84 by pivot pin 82. The respective conduits 72 and 73 are connected to opposite ends of cylinder 74, FIGS. 1 through 5 so, upon direction of hydraulic fluid under pressure into conduit 72, the plunger 76 and cam 78 will be moved longitudinally of the body portion of tong 31, whereupon, the cam 78 will engage between a pair of rollers 94, which rollers are mounted, respectively, on the body of tong 31 and movable jaw 80, as will best be seen in FIGS. 3 and 8, which will cause jaw 80 of tong 31 to pivot about pin 82 to cause jaw 80 to move pipe engaging means, such as dies 86 and 88 thereof to bindingly engage with pipe 70. The jaw 80 and body 84 have removable jaw members 92 and 90, respectively, attached thereto by fastening means. The dies 86 and 88 are attachably fitted in jaw members 90 and 92, respectively, and may be removed therefrom or therewith, to be sharpened or replaced, as desired.

Each of the rollers 94, is journaled on the respective cam bolts 96, one passing transversely through handle 84 of tong 31 and the other passing transversely through the end of the lever portion of movable jaw 80, which is adjacent the cam 78, so the axis of each roller may be varied with respect to cam 78. An adjustment wrench 98 is fitted on the head 100 of one of the cam bolts 96 and may be turned to change the axis of eccentric cam shaft 102 thereon, with respect to the face of cam 78, which each roller 94 engages. When the eccentric cam shaft 102 is propery adjusted, a thumb screw 104 is used to secure the wrench 98 in place on handle 84, which will prevent rotation of cam bolt 96 until it is desirable to change the adjustment of the eccentric cam shaft 102. The pivoted jaw member 80 of the tong 31 has a bolt 96 therethrough which is similar in construction to the above mentioned bolts 96, and the second roller 94 is mounted on a second bolt 96 and is journaled on an eccentric cam shaft 102 thereof, so, upon adjustment of second bolt 96 and eccentric cam 102, the cam roller 94, on pivoted jaw 80, may be moved in relation to the face of cam 78, thereby enabling the cam 78 to engage to the desired depth between the flanged rollers 94.

The cam 78 is bifurcated at 79 so as to straddle a tension spring 106, which spring extends between handle 84 and pivoted jaw 80, and is anchored to the jaw and handle respectively, which spring urges these portions together, which, in turn, opens the side 68 of the tong 31 to admit pipe 70 into the open side 68 of the tong, as will best be seen in FIG. 1.

The cylinder 51 has a tension spring 108 connected thereto and to an anchor 110 on mast or derrick 58, so as to draw the cylinder 51 against stop 112. The stop 112 is preferably an elastomer pad which is positioned on an anchor bolt 114, secured to the anchor 110, and has a spring 116 interposed between the anchor 110 and the elastomer pad 112 so as to minimize the shock, when the side of the cylinder 51 swings thereagainst. The bolt 114 is adjusted by compression spring 116, which will vary the longitudinal movement of tong 31 so as to enable the tong to pass onto pipe 70 from the position as shown in FIG. 1 to that shown in FIG. 2.

The tong 32 is identical in structure to tong 31, except this tong is supported from the bottom, and is in reversed position with respect to tong 31, however, all identical corresponding parts will carry identical numbers with tong 31. The tong 32 has an end of the handle 84 thereof connected to a pivot pin 44a, which pin passes through a link 118 and through the apertured end of handle 84. A tension spring 108a, is connected to the tong handle 84 and to an adjustable eye bolt 120, which eye bolt passes through a support member 121 which is secured to mast 58. The spring 108a will urge the tong handle 84 endwise into abutting relation with a screw threaded bolt 122, which is screw threaded in support member 121, which will maintain the tong 32 in correct adjusted relation so as to swing laterally into position to engage pipe 70. The cylinders 54 of the respective tongs 31 and 32 move the tongs laterally into engagement with pipe 70, upon air being directed respectively into conduits 66 and 66a, and upon directing hydraulic fluid into conduits 72, on the respective cylinders 74, the respective cams 78 are urged between respective pairs of rollers 94 on the respective tongs 31 and 32 to move pivoted jaws 80, of the respective tongs, about the respective pivot pins 82, so as to cause dies 86 and 88 of the respective tongs to engage the pipe being unscrewed, with the tong 31 passing onto the upper length of pipe and the tong 32 passing onto the lower length of pipe. With the tongs thus engaged on the lengths of pipe, hydraulic fluid is directed through conduit 51a into cylinder 51 to urge the respective plungers 48 and 49 outwardly, which moves tong handle 84 of tong 31 in an arc about the axis of pipe 70. If necessary to retract the plungers of the cylinder 51, fluid may be directed into conduits 51b and 51c, which will move the handle 84 of tong 31 into the position as shown in FIG. 1. The handle 84, on tong 31, is moved by the plungers of the hydraulic fluid cylinder 51, which handle moves through an arcuate distance determined by the stroke of plungers 48 and 49.

When the tong 31 has loosened the joints sufficiently so the length of pipe can be spun out by other mechanical means, such as by a power sub (not shown), the hydraulic fluid pressure is released from conduit 51a and is directed into conduit 51b to return the tong 31 to the position, as shown in FIG. 1, whereupon, hydraulic pressure is released from conduit 72 and is directed into conduit 73 in cylinders 74, on the respective tongs 31 and 32, which will retract cams 78 to cause the pivoted jaws to open under tension of spring 106 acting thereupon, whereupon, air is directed into conduits 64 and 64a so the tongs 31 and 32 will be moved from the position as shown in FIG. 2 to the position as shown in FIG. 1.

FLUID SYSTEM FOR POWER TONGS

The power tongs are actuated by two separate fluid systems, FIG. 14, one being compressed air to actuate certain fluid actuated cylinders and control valves for controlling a second fluid system, which is preferably a hydraulic fluid system. An air inlet conduit 131 directs air from a compressor (not shown) into the system, at a suitable pressure, usually ranging from 120 to 180 pounds, a pressure gauge 133 is provided within conduit 131 to determine the air pressure therein. Air throttling valve 132 is utilized to direct air, under pressure, selectively through conduits 64 and 66 with air exhausting through one conduit while air is passing in through the other of the conduits. This will cause cylinder 54, connected to tong 31 and to mast 58, to either move the plunger 59 therein out, or to retract the plunger, which will move the power tong 31 about pivot pin 44.

A similar throttling valve 134 has conduits 64a and 66a connected thereto, so air, under pressure, may be directed to air actuated cylinder 54 connected to tong 32. The other end of cylinder 54 is pivotally connected to mast 58. The movement of plunger 59 will cause the tong 32 to be moved about pivot pin 44a so as to swing the tong 32 laterally into and out of engagement with pipe 70.

An air control valve 136 is connected with air inlet conduit 131 and has conduits 138 and 140 leading therefrom and being connected with air actuated hydraulic valve 142. The valve 142 has a hydraulic fluid inlet conduit 144 connected thereto and to a hydraulic pump 146, so as to withdraw hydraulic fluid from reservoir 148 and direct the hydraulic fluid through conduit 144 into a port in valve 142, and with the valve in neutral position, the hydraulic fluid is passed therethrough and into conduit 150, which in turn is directed into air actuated hydraulic fluid control valve 152, and, if this valve is in neutral position, the hydraulic fluid is passed therethrough and into conduit 154 and into a further air actuated hydraulic control valve 156. If the valve 156 is in neutral position, hydraulic fluid is passed therethrough and into hydraulic return conduit 158 which leads to reservoir 148. Upon shifting the lever of control valve 136, air may be directed through one of the conduits 138 or 140, which actuate a piston within the valve 142 which will apply pressure to the valve mechanism therein to shift the valve so port 160 will be interconnected with port 162 so that hydraulic fluid, under pressure will be directed from conduit 144 through valve 142 and through port 162 into port 160, and thence into conduit 72 and into cylinder 74 on tong 32, with the hydraulic fluid from cylinder 74 returning through conduit 73 and through port 164 in valve 142, whereupon, the cam 78 on tong 32 will be engaged between rollers 94 thereon to perform a gripping action of the jaws 86 and 88 of tong 32. A pressure gauge 174 is provided within the discharge conduit 144 of the hydraulic system to enable the pressure therein to be observed. The pressure in this conduit may be regulated by pressure relief valve 172 .

A valve 166 is utilized to actuate hydraulic cylinder 74 on tong 31, in a manner similar to that described for valve 136, so as to perform a gripping action in the same manner, around pipe 70. A further air control throttling valve 168 is connected in fluid communication with air inlet conduit 131, and, when in one position, air is directed from air inlet conduit 131 to air actuated hydraulic control valve 156, in a manner similar to that set out for valve 136, and with the valves 142 and 152 in neutral position, hydraulic fluid passes therethrough, which forms an interlock. The hydraulic fluid is then directed from hydraulic supply conduit 154 into conduit 51a and thence into hydraulic cylinder 51, which is connected by a pivot pin 44 with tong 31, and with the plungers 48 and 49 moving outward, the tong 31 is engaged in tight relation with pipe 70, whereupon the pipe 70 is rotated, either to make up or to break out a screwthreaded joint, depending upon the actuation of cylinders 74 in co-ordinated relation with respect to the movement of the plungers 48 and 49.

A by-pass conduit 171 is provided intermediate the discharge of pump 146 and the reservoir 148, within which conduit 171 a pressure regulator valve 172 is positioned so as to maintain a predetermined pressure on hydraulic conduit to enable the tongs to tighten the threads of a screw-threaded joint to a predetermined torque.

SECOND FORM OF INVENTION

The second form of the invention is shown in FIGS. 15 through 18. In this form of invention, power actuated tongs 31 and 32 operate in an identical manner as the aforementioned tongs. However, these tongs may be readily used in derricks or drilling masts which utilize a rotary table. The tongs, as shown in FIGS. 15 through 18 are mounted on a wheeled carriage 201, which carriage has an outwardly extending upper arm or frame 202 and an outwardly extending lower arm or frame 204, on which arms the respective tongs 31 and 32 are pivotally mounted for performing the same operations on drill pipe 70 as set forth in the aforementioned form of invention.

The wheeled carriage 201 has wheels 206 thereon, which wheels run on parallel track members 208. A fluid actuated cylinder 210 is connected to a stationary anchor point 212. The cylinder 210 is of sufficient length that, when the plunger 214 is attached to a lug 216 on wheeled carriage 201, the plunger 214 will move the wheeled carriage into a position substantially as shown in FIGS. 15 through 18 in full outline, whereupon the tongs 31 and 32 engage the pipe 70 by actuation of valves 132, 134, 136, and 166, as shown in FIG. 14, whereupon, with the tongs engaged with the pipe 70, the air actuated hydraulic control valve 168 is selectively moved to actuate plungers 48 and 49 in a manner set out above in FIG. 14.

When the operation has been performed on the pipe, either screwing up the pipe joint or breaking out the pipe joint, the tongs 31 and 32 are released and swung out of close proximity with the drill pipe 70, whereupon, the wheeled carriage 201 is moved from the position, as shown in full outline in FIG. 18 to the position shown in dashed outline in the same figure. By directing fluid, under pressure, into conduit 217, and with the spent fluid being directed out through conduit 218, the plunger 214 will be retracted in a manner well understood in the art of fluid actuated cylinders.

A conventional slip connection S, shown in dot-dash outline, is utilized to engage drill pipe 70 to aid in withdrawing the pipe 70 from the well or in running the pipe thereinto. A conventional rotary table T is shown in dot-dash outline in FIG. 18, which may be used when the wheeled carriage 201 is retracted. The arms 202 and 204 are mounted on and secured to an upstanding standard 220 which forms the upper portion of hydraulic plunger 221, which plunger 221 is operatively mounted within hydraulic cylinder 222, which will enable hydraulic fluid to be directed from hydraulic system 224, to enable the raising or lowering of upstanding standard 220, so as to enable the power tongs 31 and 32 to be correctly positioned vertically with respect to the joint of drill pipe 70.

Each cylinder 54b, FIG. 18, actuates a bell crank 54c to move the respective tongs 31 and 32 into and out of engagement with pipe 70, substantially in the same manner as cylinder 54 in the aforementioned form of the invention.

The function performed by these tongs is substantially identical with the function performed by the aforementioned tongs, therefore it is not considered that a step-by-step, detail operation of the tongs is necessary.

By having the tongs 31 and 32 mounted on the wheeled carriage 201, the present tong arrangement may be used with a mast pole, derrick, or other form of pipe supporting structure, and when the screwing or unscrewing operation is performed, fluid may be directed into conduit 217 to retract the plunger 214 to move wheeled carriage 201 out of the working area around pipe 70. When a pipe screwing or unscrewing operation need be performed, fluid under pressure may be directed into pipe 218 to move carriage 201 into the position as shown in full outline in FIGS. 15 through 18.

AUTOMATED FORM OF POWER ACTUATED PIPE TONGS

The present power actuated pipe tongs, as shown in FIGS. 19 through 35, are readily programmed by the programming mechanism shown in FIGS. 27 through 35, so that most of the operations which have heretofore been performed manually are programmed to be performed in automated sequence, in the exact same sequence each time, in accordance with the setting of the programming cams of the mechanism.

The present form of the invention preferably employs a wheeled carriage 301, which has wheels 306 thereon, with braces 303 extending upwardly to brace an upright fluid cylinder 322 in rigid, upright relation. The wheeled carriage 301 is mounted on a trackway 308, which enables the wheeled carriage to be moved back and forth thereon, as indicated in full outline and in dashed outline in FIG. 19. An upstanding support standard or plunger 320 is mounted in fluid cylinder 322 for vertical movement therein, upon application of pressure thereinto. The upper end of the plunger 320 has an outwardly extending pivoted arm or frame 302 thereon, which mounts the upper pipe gripping tong, which is designated generally by the numeral 332, in suspended relation, thereby to enable the tong to be freely moved onto the drill stem 70, as will be more fully brought out hereinafter.

A second upright standard 324 is mounted on the wheeled carriage 301 and movable therewith, as will be seen in FIGS. 19 and 26, and serves as a guide to insure the upward and downward movement of upright standard or plunger 320 without rotation. The second upright standard 324 is braced against lateral movement by a horizontal brace 324A extending between cylinder 322 and the second upright standard 324. The upright standard or plunger 320 has a rearwardly extending member 325 thereon which has a pair of apertured lugs 326 on opposite sides thereof to receive arms 327 between each pair of lugs, which arms are pivotally mounted on respective pivot pins 328. The arms 327 each have a guide roller 329 positioned on a horizontal axle 329A so as to position a roller 329 on each opposed lateral side of second upright standard 324 to hold the rollers in contact rolling relation with second upright standard 324.

The arms 327 are held inward by bolts 330 which are mounted between lugs 330A to extend outwardly between the bifurcated ends of bars 330B which bolts enable the rollers 329 to be adjusted with respect to the opposed sides of upright standard 324 so as to enable the tongs 331 and 332 to be properly positioned for engagement of drill stem 70, so as to enable proper functioning of the automated tong mechanism.

A back-up tong, designated generally by the numeral 331 is pivoted on upstanding plunger 320 for limited movement of the tong between adjustment screws 336 in outstanding brackets 334. The back-up tong 331 is supported by an outstanding bar, frame or beam 338 which is bolted to the lower side of the tong 331 by bolt 340, and pivots therewith on pivot pin 342, which pivot pin passes through lugs 344 which are secured to upstanding plunger 320. Springs 346 are positioned between adjustment screws 336 and bar 338 to maintain elongated body or tong handle 348, which is mounted on pivot pin 342, in a central position.

An elongated cylinder 310 is pivotally mounted a spaced distance outward from wheeled carriage 301, as will best be seen in FIG. 26, and the plunger 314 thereof is connected to a lug 316 mounted beneath the wheeled carriage 301.

The fluid cylinder 322 may be hydraulically operated and have a hydraulic system associated therewith; however, the fluid cylinder 322 may be operated by air, if so desired. The piping and controls of which will be more fully brought out hereinafter. The position of the automatic slip arrangement is shown in dashed outline in FIG. 19, to show the relation of the slips S to the rotary table T and to the drill stem 70.

The present back-up tong 331 and the power tong 332, are distinguished from the tongs in the aforementioned form of tongs, by the fact that they are end opening tongs, so that the carriage 301 may move along trackway 308, inwardly, to engage the tongs with the drill stem 70, and may be moved outwardly on trackway 308 so that the tongs and the carriage will not interfere with the normal activities of workmen on the platform of the drilling rig. The back-up tong, 331, as shown in detail in FIGS. 20 through 24, is shown in two positions. FIG. 24 shows the tong in open position and FIG. 20 shows the tong in closed position.

The tong handle 348 has a pivoted lever or jaw 350 pivoted on a pin 352 so the tong may be swung from the position as shown in FIG. 24 to that shown in FIG. 20. A lever or jaw 354 is pivotally mounted near the outer end of lever 350 by a pivot pin 356, so as to pivot these levers relative to each other. A latch member 358 is pivotally mounted on pivot pin 360, which pin is positioned near the outer end of lever 354. A lever or jaw 362 is pivoted near the outer end of tong handle 348 by a pivot pin 364 to swing the lever from the position as shown in FIG. 24 to that shown in FIG. 20, upon actuation of the fluid cylinders as will be more fully brought out hereinafter.

A lever 366, having teeth 368 thereon, is pivoted near the outer end of lever 362 by a pivot pin 370. The teeth of the lever 366 are engageable with latch pawl 372 on latch lever 358, when the tong is in closed position, as shown in FIG. 20. The latch lever 358 has a handle 374 thereon to enable the tong to be manually unlatched, if and when desired.

The springs 346 normally maintain back-up tong handle 348 in a central position, as adjusted by adjustment screws 336; however, these springs are yieldable, upon the fluid actuated cylinders causing the tong 331 to close around the drill stem 70, as shown in FIG. 20, and which will be more fully brought out hereinafter.

The tong handle 348 has outstanding, apertured lugs 376 thereon, the apertures of which lugs are adapted to receive a pivot pin 378 therethrough and through the aperture of apertured lug 380 on the end of a fluid actuated cylinder 382. The fluid actuated cylinder 382 has a fluid line 384 connected in fluid communication to one end thereof and a fluid line 386 connected in fluid communication to the other end thereof. A fluid actuated plunger 388 is operably mounted in fluid actuated cylinder 382 and extends outward therefrom and has an apertured clevis 390 on the end thereof to receive a pivot pin 392 therethrough and through an apertured lug 394 on lever 350, so, upon actuation of the plunger 388, the lever 350 will pivot relative to tong handle 348.

Further lugs 396, which lugs are apertured, are mounted on lever 350 intermediate the length thereof, and a pivot pin 398 passes therethrough and through the apertures of a lug 400 on the end of fluid cylinder 402.

A fluid line 404 is connected in fluid communication with one end of cylinder 402 and a fluid line 406 is connected in fluid communication with the other end thereof. A plunger 408 is mounted in cylinder 402 and extends outward therefrom and has an apertured clevis 410 on the outer end thereof. A pin 412 passes through the aperture of clevis 410 and through an aperture in a lug 414, which lug is mounted intermediate the length of lever 354, and the fluid cylinder 402 moves the levers 350 and 354 relative to each other.

The lever 354 has further lugs 416 thereon, which lugs are apertured, the apertures of which receive a pivot pin 418 therethrough and through an aperture within a lug 420 on an end of fluid actuated cylinder 422. A fluid line 424 is connected in fluid communication with one end of cylinder 422 and extends therefrom. A fluid line 426 is connected in fluid communication with the other end of the cylinder 422 and extends therefrom. A plunger 428 is operably mounted in fluid actuated cylinder 422 and has an apertured clevis 430 secured to the outwardly extending end thereof. A pivot pin 432 is positioned within the aperture of clevis 430 and through an aperture formed in lever 359, which lever 359 extends outward from a side of lever 358 so as to form a bell crank to pivot the latch lever 358 about pivot pin 360 thereof, upon actuation of fluid actuated cylinder 422.

The tong handle 348 has a loop 434 on a side thereof to form a hand-hold by which to manually guide the tong, if so desired.

Apertured lugs 436 are positioned on the tong handle 348, on the side thereof opposite lugs 376, through which apertures a pivot pin 438 passes and through an aperture in a lug 440 on the end of fluid actuated cylinder 442. A fluid line 444 is connected in fluid communication to one end of the cylinder 442, and leads therefrom, with a fluid line 446 being connected in fluid communication with the opposite end of the cylinder and leads therefrom. The fluid actuated cylinder 442 has a plunger 448 operably mounted therein and extending outward therefrom, which plunger has an apertured clevis 450 secured to the outer end thereof, the aperture of which clevis receives a pivot pin 452 therethrough and through an aperture in a lug 454 on pivoted lever 366.

The lever 350 has a toothed pipe engaging die 456 removably fitted therein for engagement with drill stem 70. The pivoted lever 354 has a toothed pipe engaging die 458 removably fitted therein, and the pivoted lever 362 has pipe engaging dies 460 removably fitted therein, so when the levers 350, 354 and 362 are moved into position, as shown in FIG. 20, the removable toothed dies 456, 458 and 460 will engage the drill stem 70 in gripping relation.

The tong 332 is identical in construction with tong 331, except the end of the handle 462 of tong 332 has a pivot pin 464 therein, to which is attached a clevis 466, at the outer end thereof. A plunger 468 is operably mounted in fluid actuated power cylinder 470, which cylinder is pivotally mounted on pivot pin 471 between outstanding apertured lugs 472, which lugs are secured to the upstanding plunger 320 above lugs 344, as will best be seen in FIG. 19. The handle 462 of break-out tong 332 is pivotally supported by pivoted arm, frame or linkage 302 which pivotally attaches to a support bolt 474 which is pivotally secured to elongated body or handle 462 by a bolt 476 and plate 477.

The upstanding plunger 320 has a pair of outwardly extending, apertured lugs 478 thereon, in which apertures pivot pins 480 are pivotally mounted to pivotally mount a single acting, spring return, fluid actuated cylinder 482 thereon. The fluid cylinder 482 has a fluid line 484 connected, in fluid communication, to the end thereof opposite the plunger 486, which plunger is mounted in the cylinder 482 in operable relation. A clevis 488 is mounted on the outer end of the plunger 486 and connects to a bell crank lever 490, with the end of the pivoted arm 302 of the bell crank lever being pivotally mounted on pivot pin 492, so as to pivot the arms 302 and 302A about pivot pin 494 and about pivot pin 474, which supports break-out tong 332 in pivoted relation.

With the power actuated tong 332 supported in this manner, the fluid actuated cylinder 422A may be operated by manually controlled valves 722D and 724D, FIG. 35, as will be more fully brought out hereinafter, to position the tong 332 in close proximity to drill stem 70. The tongs 331 and 332 are a fixed, vertical distance apart, as will be readily seen in FIG. 19, however, upon raising or lowering the upstanding plunger 320, by the fluid actuated cylinder 322, the tongs may be readily brought into proper register with the tool joints of the drill stem 70.

AUTOMATED PROGRAMMING MECHANISM

The automated programming mechanism, as shown in FIGS. 27 through 35, is of the same construction and has the same manner of operation as the automated programming mechanism in my co-pending application filed on or about April 24, 1967, for Automated Drill Stem and Pipe Positioner Device, Ser. No. 633,232, except the present device has additional programming cams to operate a greater numer of fluid actuated power mechanisms.

The motor driven, cam actuated programming device is designated generally by the numeral 500, which device is mounted on a base 501, with the motor being designated at 502, which motor may be driven either by electricity or by fluid, preferably air.

The present motor, as described herein, is fluid driven, which motor includes the necessary fluid conduits and motor valves to bring about the proper operation of the motor. A drive pinion 504 is secured to the end of the motor shaft 506, which pinion 504 is engaged in meshed relation with a gear 508 mounted on cam receiving shaft 510. The cam shaft 510 is journaled in bearings 512 which are held in place by quick removable caps 513, which are held in place by bolts 511. This enables the cam shaft 510 and the programmed assembly of cams thereon to be programmed for one operation, such as breaking out drill stem or pipe by the use of power tongs, then this cam shaft and the assembly of programmed cams thereon can be quickly removed by removal of the caps 513 and a similar cam shaft can be installed to sequentially operate cam actuated valves to enable a second cam shaft and the cam assemblies thereon to perform the operation of making up or screwing together drill stem or pipe, without the necessity of adjusting any of the cams thereon. However, the tongs and the tong actuating cylinder will have to be reversed, upon the change of operation.

When the second programmed cam shaft is fitted into place, with the gear 508 and the pinion 504 in meshed, driving relation, the caps 513 are bolted in place by bolts 511 or cap screws 511. The shaft 510 is preferably flattened, as indicated at 514 so that the hub or flange 516 may be secured thereto by a set screw 518, with a minimum possibility of slippage.

Perforate cam discs 520 and 522 are bolted to cam hub 516 so that the bore of each of the cam discs 520 and 522 will complementally fit on the shouldered portion 524 of cam hub 516. The cam hub or flange 516 has circumferentially spaced holes 526 therein, which, in the present instance, twelve equally spaced holes are shown. The perforate cam discs 520 and 522 each, preferably, have the same number of equally spaced holes therein, as designated at 528, and are shown to be fourteen holes in number, which holes are equally spaced, circumferentially about the same bolt center as the holes 526 in hub or flange 516. Bolts 530 are adapted to pass through holes 526 and 528 so as to hold the discs in binding relation to hub or flange 516. By having the number of holes in the perforate discs vary with respect to the holes in the hub or flange 516, a vernier adjusting relation may be had with respect to the hub or flange 516, when the discs 520 and 522 are secured on the hub or flange 516. In the present instance, the adjustment can be varied by increments of approximately two degrees of the outwardly extending cam members 532 and 534 with respect to hub or flange 516. However, more minute adjustments may be had by varying the number of holes in the hub with respect to the number of holes in the respective cam discs.

The present device is shown to have a cam shaft with ten cam assemblies thereon, each with perforate discs 520 and 522 secured thereto by bolts 530, with outwardly extending pins or cam members 532 and 534 secured thereto for adjustment throughout the circumference of the respective hubs.

The composite assembled cams are designated generally at A, B, C, D, E, F, G, H, I and J. The cam assembly A has an outwardly extending pin 534A on the perforate disc 522, which pin engages a pilot valve actuator member 536 on pilot valve 538 to open a passage therein. The pilot valve 538 is a three-way, off, on and bleed valve, which directs fluid from fluid supply line 498A, FIG. 35, into fluid line 542, through manual control, three-way, on, off and bleed valve 544 to pilot control valve 538. When the valve 538 is opened by cam 534A, fluid is directed therethrough into the end of motor control valve 540, to move a valve element therein (not shown), which element closes the fluid passage in motor control valve to stop the motor 502. This will cause the conventional pressure valve element therein (not shown) to shift the valve 540 into closed position, and, at the same time, fluid is bled from the three-way, pilot control valve 538. With the valve 540 in this position, and with the valve 544 open, the programming device is ready to operate.

The motor 502 is initially started by depressing a button 546 on three-way, off, on and bleed control valve 548 against the tension of a spring, whereupon fluid is momentarily directed from fluid supply line 498B, whereupon fluid will flow out through three-way, off, on and bleed, starting valve 548, which is manually operated, into fluid line 550 to move a valve element (not shown) in motor control valve 540 to open position, then, upon release of button 546, fluid will be bled from fluid line 550 and valve 548. Upon the valve 540 being moved to open position fluid will be directed from fluid supply line 498 through fluid supply line 551 into fluid line 553 which leads through three-way valve 541A and either through conduit 553A or conduit 553B to drive the motor 502 in either direction.

The motor 502 normally operates the cam shaft 510 in a clockwise direction, facing the end of shaft 510, which will move the outwardly extending cam member 534A until the pilot valve actuator member 536 is disengaged from cam member 534A, whereupon, the motor will continue to rotate shaft 510 in geared relation so as to cause cam member 532B, on cam assembly B to come into engagement with pilot valve actuator member 552 on pilot valve 558 to open a passage therein and with a valve 554 open, fluid will be directed from fluid supply line 498B through fluid line 556, through pilot actuator valve 558 to one end of four-way control valve 726, whereupon the movable valve element therein (not shown) will be moved to open a port therein to direct fluid from line 560 through valve 726 into fluid line 384A to the end of the fluid cylinder 382A, mounted on power actuated tong 332, opposite the plunger 388 thereof. Upon directing fluid through fluid line 384A into fluid cylinder 382A the plunger 388 will be projected outwardly and the air will be exhausted from the opposite end of fluid cylinder 382A, which fluid will be directed into fluid line 386A to the four-way control valve 726 to be exhausted therefrom to atmosphere, if air, and to be directed into a reservoir, if a liquid.

Simultaneously, a cam projection 532E, on cam assembly E, will engage pilot valve actuator 562 to open a passage through three-way, off, on, and bleed pilot valve 564, so as to direct fluid from fluid supply line 498B into fluid line 566, through manually operated, off, on and bleed valve 568 through open passage in valve 564 to the end of four-way control valve 732, so as to move a valve element therein (not shown) to open a port to direct fluid from line 570 into fluid line 444A to the end of the cylinder 442A, mounted on power actuated tong 332, opposite plunger 448 thereof to move the plunger outwardly.

Simultaneously with the outward movement of plunger 448 in cylinder 442, mounted on the back-up tong 331, fluid will be exhausted into fluid line 446A into and through valve 732 to atmosphere, if an air system is used, or to a reservoir, if a liquid system is used. This will enable the movement of levers or jaws 350 and 362, respectively, about their respective pivot pins 352 and 364, to urge the respective toothed dies 456 and 460, of the power actuated tong 332, into engagement with drill stem or pipe 70.

Simultaneously with cam projections 532B and 532E engaging the respective pilot valve actuator elements 552 and 562, the cam projection 532F on cam assembly F, will engage pilot valve actuator member 572 on three-way, off, on, and bleed, pilot valve 574, which will open a passage therethrough to direct fluid from fluid supply line 498B through fluid line 576, through manually controlled, off, on and bleed valve 578, through an open port in pilot valve 574 to an end of four-way control valve 734, which will move a valve element therein (not shown to open a port in the valve 734 to direct fluid from fluid supply line 498 into fluid line 580 and through four-way control valve 734 into fluid line 384 to the end of the cylinder 382, mounted on back-up tong 331, opposite the plunger 388 thereof, whereupon, the plunger 388 will be moved outwardly and the fluid exhausted from the outer end thereof will be directed into fluid line 386 and through four-way control valve 734 to atmosphere, if air is used, or to a reservoir, if liquid is used.

Simultaneously, a cam element 532I, on cam assembly I, will move into engagement with a pilot valve actuator member 582, which will open a passage in pilot valve 584, whereupon, fluid will be directed from fluid supply line 498B into fluid line 586, through manually controlled, off, on and bleed valve 588 through the open port in pilot valve 584 and into an end of four-way control valve 740 to move the valve element therein (not shown), so as to direct fluid from fluid supply line 498, through fluid line 590, through valve 740 into fluid line 444 into an end of cylinder 442, mounted on the back-up tong 331, opposite the plunger 448 thereof to move the plunger outwardly, whereupon, the fluid within the cylinder 442 is discharged into fluid line 446 to and through four-way control valve 740, whereupon, the fluid, if air, is discharged to atmosphere, or if liquid, to a reservoir.

It is to be noted that plungers 388 and 448, in the respective fluid cylinders 382 and 442 will simultaneously actuate levers or jaws 350 and 362 about the respective pivot pins 352 and 364 to move the respective pipe engaging dies 456 and 460, of the back-up tong 331, into engagement with drill stem or pipe 70.

As the cam shaft 510 continues to rotate cam projection 532C, on cam assembly C, will move into engagement with pilot valve actuator member 592, which will open a passage in pilot valve 594 to direct fluid from fluid supply line 498B into fluid line 596, through manually controlled, three-way, off, on and bleed valve 598, through the open passage in pilot valve 594 to an end of four-way control valve 728 to move a valve element therein (not shown), which will open a passage therethrough to direct fluid from fluid supply line 498 through fluid line 600, through four-way control valve 728, thence into fluid line 404A which leads to the end of cylinder 402A, on power actuated tong 332, opposite the plunger 408 thereof, to move the plunger 408 outwardly, which will exhaust fluid into fluid line 406A to four-way control valve 728 to be exhausted to atmosphere, if air is used, or to a reservoir, if liquid is used.

Simultaneously with cam projection 532C engaging pilot valve actuator member 592, cam projection 532G engages a pilot valve actuator member 602 on cam actuated pilot valve 604 to open a passage therein; whereupon, fluid is directed from fluid supply line 498B into fluid line 606 through manually controlled, three-way, off, on and bleed valve 608, through an open passage in pilot control valve 604 through fluid line 606 to an end of four-way control valve 736, whereupon, a valve element therein (not shown) will be moved to open a passage therethrough to direct fluid from fluid supply line 498 into fluid line 609 into fluid line 404 to the end of cylinder 402, mounted on back-up tong 331, opposite the plunger 408 thereof to move the plunger outwardly to discharge fluid into fluid line 406 into and through four-way control valve 736; whereupon, the fluid, if air, will be exhausted to atmosphere, or if liquid, it will be directed into a reservoir.

Upon outward movement of plungers 408 in the respective cylinders 402 and 402A, the levers or jaws 354, of the back-up tong and power actuated tong 331 and 332, respectively will be moved about the respective pivot pins 356 to bring the pipe engaging dies 458 into engagement with the drill stem or pipe 70, with the respective jaws or levers in this position, and with the respective cylinders 442 and 442A, on the back-up tong 331 and power tong 332 having also moved a lever 366 on each tong into engagement with drill stem or pipe 70, simultaneously as the respective levers 362 on the respective tongs are moved, the tongs are now ready to be latched together for operation.

Upon the cam shaft 510 continuing to rotate cam projection 532D, of cam assembly D, rotates into engagement with pilot valve actuator member 610, which will cause a passage within pilot valve 612 to be opened, which will direct fluid from fluid supply line 498B into fluid line 614 to and through manually controlled, three-way, off, on and bleed valve 616 through the open passage in pilot valve 612 through fluid line 614 to an end of four-way control valve 730 to move a valve element therein (not shown) to open a passage therein to direct fluid from fluid supply line 498, through fluid line 618, through the open passage into fluid line 424A to the end of cylinder 422A, mounted on power actuated tong 332, to cause the plunger 428 therein to move outwardly, which will cause fluid to be discharged from the opposite end thereof into and through fluid line 426A and through four-way control valve 730 to atmosphere, if air is used, to be directed into a reservoir, if liquid is used.

Simultaneously with the cam projection 532D engaging pilot cam actuator member 610, a cam projection 532H, on cam assembly H, rotates into engagement with pilot valve actuator member 620 to actuate pilot control valve 622 to open a passage therein; whereupon, fluid under presssure will be directed from fluid supply line 498B, through fluid line 624, through manually controlled, three-way, off, on and bleed valve 626, to and through open passage in pilot valve 622, through fluid line 624 to the end of four-way control valve 738 to move a valve element therein (not shown) to open a fluid passage therethrough to direct fluid under pressure from fluid supply line 498, through fluid line 628, through the open passage in valve 738 into fluid line 424 to the end of fluid cylinder 422, mounted on back-up tong 331, to the end of the cylinder 422 opposite plunger 428 thereof, which will cause plunger 428 to move outwardly, which will cause the fluid therein to be directed into fluid line 426 to four-way control valve 738 to be discharged to atmosphere, if air, and to be directed into a reservoir, if a liquid is used.

The plungers 428, of the respective cylinders 422 and 422A, mounted on back-up tong 331 and power tong 332, respectively, will be projecting outwardly, and the respective levers 359, each of which is integrally formed with a latch lever 358, which levers will be moved about the axis of the respective pins 360 to cause the abutments or pawls 372 to engage one of the teeth 368 on the respective levers 366, as shown in FIGS. 20 and 25.

With the back-up tong 331 and the power tong 332 in this positioon, and with the cam shaft 510 rotating, one of the projections 532J, on cam assesmbly J, will move into engagemetn with pilot valve actuator 630 on pilot valve 632, which will open a passage therein to direct fluid from supply line 498B, through fluid line 634, through manually controlled, three-way, off, on and bleed valve 636, through the open passage in pilot valve 632 and through fluid line 634 to an end of valve 742 to move a valve element therein (not shown) into position to open a passage therethrough, which will direct fluid from fluid supply line 498 into fluid line 638 through an open passage in four-way control valve 742 to direct fluid under pressure through fluid line 470A to the end of fluid cylinder 470, which is pivotally mounted on pivot pins 471 on lugs 472 on upright plunger 320. With fluid being directed into the end of cylinder 470 opposite the plunger 468 thereof, the plunger 468 will be extended and fluid from the opposite end of the cylinder will be exhausted through fluid line 470B to four-way control valve 742 to be exhausted to atmosphere, if air is used, or to be directed into a reservoir, if liquid is used.

The plunger 468 is pivotally connected to the outer end of handle 462 on power actuated tong 332. The reciprocation of plunger 462 will rotate drill stem or pipe 70 to unscrew the upper joint, if the lower joint is held by back-up tong 331, if the plunger 468 is moved outward, as indicated in FIG. 26; however, if the back-up tong 331 and the power tong 332 are turned over, that is, bottom side to top side, the same back-up tong can be used to hold the pipe, while the power actuated tong 332 is used to make up or screw the pipe together.

Further cam projections 532J are shown on the same cam disc 520, which will engage pilot actuator member 630 immediately upon a cam projection element 534J engaging pilot valve actuator 640 to open a passage in valve 642, which will direct fluid under pressure from fluid supply line 498A into fluid line 644, through manually controlled, three-way, off, on and bleed valve 646, through an open passage in valve 642, through fluid line 644 to the end of four-way control valve 742 opposite fluid line 634; whereupon, a valve element therein (not shown) will be moved to the opposite position, to direct fluid from fluid supply line 498 through fluid supply line 638 through another passage in four-way control valve 742 into fluid line 470B to the plunger end of the cylinder 470; whereupon the plunger 468 will be retracted to move handle 467 of power actuated tong 332 into a retracted position with respect to the position shown in FIG. 26. As many cam projections 332J and 334J, as desired, may be added to sequentially reciprocate the plunger 468 to loosen the threaded joint, if pipe is being unscrewed, to enable the remaining threads to be spun out by a pipe spinner, in the conventional manner.

Upon the power actuated tong 332 being reciprocated the desired number of strokes, by fluid cylinder 470, the cam shaft 510 rotates cam projection 534D, on cam assembly D, into engagement with the pilot valve actuator member 648 of pilot valve 650 to open a passage therein; whereupon, fluid will be directed from fluid supply line 498A into fluid line 652 through manually controlled, threeway, off, on and bleed valve 654, through the open passage in pilot valve 650 to the opposite end of four-way control valve 730 from fluid line 614; whereupon, fluid under pressure will be directed from fluid supply line 498 through fluid line 618 through an open passage in four-way control valve 730 into fluid line 426A and to the plunger end of fluid actuated cylinder 422A. Whereupon, the plunger 428 will be retracted to move levers 359 and 358 about the axis of pin 360 to unlatch the pawl 372 from teeth 368 of lever 366.

Simultaneously, the cam shaft 510 rotates cam projection 534H on cam assembly H so as to come into contact with pilot valve actuator member 656 on pilot valve 658 to open a passage therein; whereupon, fluid is directed from fluid supply line 498A into fluid line 660 through an open, manually operated, three-way, off, on and bleed valve 662 to the open passage in pilot valve 658 and through fluid passage in pilot valve 658 and through fluid line 660 to the opposite end of four-way control valve 738 from fluid line 624, whereupon, a valve element (not shown) in four-way control valve 738 will open another passage therein to direct fluid from fluid supply line 498 through fluid line 628 through an open passage in four-way control valve 738 and into fluid line 426 which leads to the end of cylinder 422 adjacent plunger 428, where, upon retracting plunger 428, the levers 359 and 358 will be moved about the axis of pivot pin 360 to move pawl 372 out of engagement with teeth 368 on lever 366. Upon the plunger 428 being retracted, fluid will be exhausted from the opposite end of cylinder 422 into fluid line 424 to four-way control valve 738 to be exhausted to atmosphere, if the fluid used is air, or into a reservoir, if the fluid used is a liquid.

With the cam shaft 510 rotating, cam projection 534C, on cam assembly C, will move into engagement with pilot valve actuator member 663 to open a passage in pilot valve 666, which will direct fluid from fluid supply line 498A into fluid line 668 through open, manually controlled, three-way, off, on and bleed valve 670, through the open passage in pilot valve 666 and through fluid line 668 to the end of four-way control valve 728 opposite fluid line 596. This will move the valve element therein (not shown) to a position to open another passage through valve 728 to direct fluid under pressure from fluid supply line 498 through fluid line 600, through the open passage in four-way control valve 428 into fluid line 406A to the end of the cylinder 402A adjacent plunger 408 thereof; this will cause plunger 408 to be retracted to move lever or jaw 354 about pivot pin 356, on power actuated tong 332, to disengage die 458 from drill stem or pipe 70. Simultaneously, fluid will be discharged out through the opposite end of cylinder 402A to the four-way control valve 728 to be exhausted therefrom to atmosphere, if the fluid used is air, or to a reservoir, if the fluid used is a liquid.

Simultaneously with the engagement of the cam projection 534C with pilot valve actuator member 663, the cam projection 534G, on cam assembly G, is moved into engagement with pilot valve actuator member 672 on pilot valve 674 to open a passage therethrough, whereupon, fluid under pressure, is directed from fluid supply line 498A into fluid line 676, through manually controlled, off, on and bleed valve 678 through the open passage in pilot valve 674 and through fluid line 676 to the end of four-way control valve 736 to the end opposite fluid supply line 606 so as to move the valve element therein (not shown) to open another passage therethrough, so fluid under pressure will be directed from fluid supply line 498 through air line 609, through four-way control valve 736 into fluid line 406 to the plunger end of cylinder 402, whereupon fluid is exhausted from the opposite end thereof into fluid line 404 and out through four-way control valve 736 to atmosphere, if the fluid used is air, or to a reservoir, if the fluid used is liquid. This will rotate lever or jaw 354 on back-up tong 331 about the axis of pivot pin 356 to disengage die 358 from drill stem or pipe 70.

With the cam shaft 510 continuing to rotate, cam projections 534B, 534E, 534F and 534I, on the respective cam assemblies B, E, F, and I, are rotated into engagement with the respective pilot valve actuator elements 680, 682, 684 and 686 to open a passage in the respective pilot valves 688, 690, 692, and 694, to direct fluid from fluid supply line 498A into the respective fluid lines 696, 698, 700, and 702, and through the respective manually controlled, three-way, off, on and bleed valves 704, 706, 708, and 710 to direct fluid into and through the respective pilot valves 688, 690, 692, and 694 to direct fluid to the respective four-way control valves 726, 732, 734 and 740 in the ends thereof opposite the respective fluid lines 556, 566, 576, and 586, which will move an element in the respective valves (not shown) to open a passage in the respective valves 726, 732, 734 and 740 to simultaneously direct fluid from fluid supply line 498, into the respective fluid lines 560, 570, 580 and 590, to and through the respective valves 726, 732, 734 and 740 into the respective fluid lines 386A, 446A, 386 and 446, which will simultaneously retract the plungers of the respective cylinders to pivot the respective levers 350 and 362 on back-up tong 331 and the levers 350 and 362 on power actuated tong 332 to simultaneously disengage the die elements 456 and 460, in the respective levers or jaws, from the drill stem or pipe 70, so as to move the levers from the position as shown in FIG. 20 to the position as shown in FIG. 24.

In performing the above operations, fluid will be discharged from the opposite ends of cylinders 382A, 442A, 382 and 442 through fluid lines 384A, 444A, 384, 444, through the respective four-way control valves 726, 732, 734, and 740 to atmosphere, if the fluid is air, or to a reservoir, if the fluid is liquid.

Upon completion of the tonging operation of power actuated tong 332 and the back-up tong 331, on the drill stem or pipe and with the various fluid operated cylinders opening the jaws of the tongs in the manner aforementioned; the cam shaft 510 will rotate cam projection 534A on cam assembly A, into contact relation with pilot valve actuator 536 to open a passage in valve 538; whereupon, fluid, under pressure, is directed from fluid supply line 498A through fluid line 542, through manually actuated three-way, on, off and bleed valve 544 through the open passage in cam actuated pilot valve 538 to direct fluid into and through pilot control valve 538 and through fluid line 542 to the end of motor control valve 540 opposite fluid line 550; whereupon, the passage in the motor control valve 540 will be closed to close off fluid to fluid line 553, which will cause the motor 502 to stop. It is necessary to manually actuate valve 548 to initiate subsequent operations.

With the tongs 331 and 332 in open position, as indicated in FIG. 24, a manually actuated, four-way fluid control valve 712 is actuated to direct fluid from fluid supply line 498 through line 714 into the end of cylinder 310 adjacent the plunger 314 thereof; whereupon, plunger 314 is retracted, which plunger is connected to a lug 316 on wheeled carriage 301, thereby the tong assembly is moved out of the operating area. The fluid is directed from the opposite end of cylinder 310 out through fluid line 716 and exhausted through valve 712 to atmosphere, if air is the fluid used, or to a reservoir if the fluid used is a liquid.

To move the wheeled carriage 301 inwardly, the valve 712 is moved to the opposite position to disuharge fluid through line 716 into the end of cylinder 310 opposite the plunger 314 thereof, whereupon, the back-up tong 331 and the power actuated tong 332 are both moved into contact relation with the drill stem or pipe 70.

If the tongs need vertical adjustment for height, a valve 433 is manipulated to direct fluid, either from fluid supply line 433A through manually operated, four-way control valve 433 into fluid line 433B into the lower end of fluid cylinder 322, if it is desired to raise the plunger 320, on which spaced apart tongs 331 and 332 are mounted, with the fluid being exhausted from the opposite end of cylinder 322 and out through fluid line 433C to atmosphere, if air is the fluid used, or into a reservoir 433D, if the fluid used is a liquid or the valve 433 may be manipulated to direct fluid from fluid supply line 433A through valve 433 into fluid line 433C to the upper end of fluid cylinder 322 with the fluid, under pressure, moving plunger 320 downward and exhausting the fluid out through fluid line 433B, through valve 433 and, if air is used, the fluid will be exhausted to atmosphere, but if liquid is used, the fluid will be exhausted through a fluid return pipe to the reservoir 433D. A pump P is shown as being positioned in line 433A, which may be a hydraulic pump to withdraw fluid from reservoir 433D, furthermore, the system may operate on two different fluids, such as by connecting the fluid supply line 498A in fluid communication with valve 433, if air is used and connecting the valve 433 in fluid communication with the pump P, if hydraulic fluid is to be used; however, it is preferable to use air, if air is available, in the fluid supply line 498A.

A three-way, manually controlled valve 718 is provided in fluid line 720, which line leads from fluid supply line 498, and connects through valve 718 to fluid line 484, which leads to an end of a one-way, fluid actuated cylinder 482, which cylinder is spring returned. The fluid pressure in cylinder 482 urges plunger 486 outwardly, upon actuation of valve 718 and permits the plunger 486 to be retracted by the spring, when valve 718 is moved to another position. The plunger 486 is connected to a bell crank 490 which moves levers 302 and 302A laterally, so as to move the power actuated tong 332 laterally to properly position the tong on the drill stem or pipe 70.

The respective manual, three-way, off, on and bleed valves between the respective fluid supply lines 498A and 498B and the respective cam actuated pilot valves may be manually operated to selectively render any station inoperative.

A three-way, manually operated, off, on and bleed valve 722B, 722C, 722D, 722E, 722F, 722G, 722H, 722I, 722J, 724A, 724B, 724C, 724D, 724E, 724F, 724G, 724H, 724I and 724J is connected in by-pass relation around each of the cam actuated pilot valves which enables any operation to be performed manually, by selectively operating these valves when the cam shaft 150 is not rotating.

While several of the cams have been indicated as performing simultaneous operations, this is a matter of choice, in programming the cam shaft assembly. An entire cam shaft may be removed from the device, by removing caps 513, and a different shaft programmed for other operations may be employed, thereby enabling a shaft, properly programmed for one operation, to be removed and set aside to future use.

Under normal operation, the same programmed shaft may be used on the power actuated tong for making up drill stem or pipe, as it is used in breaking out drill stem or pipe; as explained heretofore, each tong will have to be reversed, side for side, together with the actuating mechanism connected thereto.

Having thus clearly shown and described the invention, what is claimed as new, and desired to be secured by Letters Patent is:

1. An automated, power actuated tong arrangement for rotating pipe, which tong arrangement comprises:
   (a) a frame,
   (b) a pair of tongs pivotally associated with said frame and lying in spaced apart horizontal planes,
      (1) each tong of said pair of tongs being pivotally supported for limited lateral movement within the respective planes,
      (2) each tong having an elongated body,
      (3) one of said tongs of said pair of tongs being a back up tong and the other of said tongs being a power actuated tong,
   (c) a plurality of jaws mounted on the distal end of each said elongated tong body adjacent the drill stem or pipe on which the tong is to fit,
      (1) pipe engaging dies mounted within certain of said jaws,
      (2) latch members associated with certain of said jaws remote from said elongated tong bodies,
   (d) fluid actuated cylinders connected to said elongated tong bodies and to certain said jaws,
   (e) further fluid actuated cylinders interconnecting between adjacent jaws on each said elongated tong body,
      (1) a fluid actuated cylinder connected to one of said jaws to actuate said latch members to connect said jaws together,
      (2) valving means sequentially directing fluid to one end of each said fluid actuated cylinders to successively close said jaws around a drill stem or pipe and to actuate said latch members so as to connect said jaws therearound,
   (f) power means to selectively move said elongated body of one of said tongs in arcuate relation about the axis of said drill stem or pipe to rotate said drill stem or pipe,
   (g) further valving means to selectively direct fluid into the opposite end of said fluid actuated cylinders to unlatch said latch members to disengage said jaws from the drill stem or pipe,
   (h) a programming device
      (1) said programming device being motor driven,
      (2) fluid lines leading from said programming device to the respective fluid cylinders on said tongs,
      (3) cam actuated valves associated with said programming device,
      (4) cams on said programming device and being rotatable by said motor to sequentially operate certain of said valves to cause said fluid cylinders to close said jaws in latched relation around said drill stem or pipe and to selectively actuate cams to reciprocate said fluid cylinder connected to said elongated tong body,
      (5) certain of said cams adapted to selectively actuate valves to direct fluid to the opposite end of certain of said cylinders connected to said latch members and to said jaws on said tongs to release said latch members from connection with said jaws to disengage said jaws from the drill stem or pipe.

2. An automated power actuated tong arrangement for rotating pipe, as defined in claim 1; wherein:
   (a) a cam shaft is mounted on said programming device in journaled relation, and being connected in driven relation with said motor,
   (b) cam hubs mounted on said cam shaft,
      (1) each said cam hub having a plurality of circumferentially spaced holes formed therein near the periphery thereof,
      (2) pairs of discs mounted on each said cam hub,
         (i) each said disc having a plurality of circumferentially spaced holes formed therein, said holes being different in number from the holes in said cam hubs, with said holes in said hubs and the holes in said discs having the same radial bolt centers,
      (3) fastening means detachably and adjustably securing said discs to said hubs for adjustment of said discs with respect to said hub,
      (4) an outstanding projection on each said disc to form each said cam,
   (c) said valving means being cam actuated pilot valves,
      (1) a valve actuator on each said pilot valve,
      (2) each said outstanding projection which forms each said cam being adapted to engage a valve actuator of each said pilot valve in programmed sequence, upon rotation of said cam shaft,
   (d) further valving means connected in fluid communication with each said cylinder,
      (1) a fluid supply line connected to each said further valving means,
      (2) each said pilot valve being selectively opened and closed by one said valve actuator,
      (3) each said pilot valve being connected in fluid communication with a fluid supply line,
      (4) said fluid supply lines connecting said further valving means with said respective fluid cylinders on said tongs, so upon said pilot valves being opened by said valve actuator, said further valving means will direct fluid to one end of certain of said fluid cylinders and will direct fluid from the other end of said fluid cylinders and through said further valving means, (5) manually controlled means to initiate the starting of said motor, and (e) cam means on said cam shaft to terminate the operation of said motor when the cycle of operation is completed.

3. An automated, power actuated tong arrangement for rotating pipe, which tong arrangement comprises:
(a) a frame,
(b) a pair of tongs pivotally associated with said frame and lying in spaced apart parallel planes,
  (1) each tong of said pair of tongs being pivotally supported for limited lateral movement within the respective planes,
  (2) each tong having an elongated body,
(c) a plurality of jaws pivotally mounted near the distal end of each said elongated tong body adjacent the pipe on which it is to fit, which jaws are adapted to move about axes which are parallel to the pipe,
  (1) pipe engaging dies mounted within certain of said pivoted jaws,
  (2) pivoted latch members mounted on certain of said pivoted jaws for movement about axes which are parallel to the pipe,
(d) fluid actuated cylinders connected to each said elongated tong body and to certain of said pivoted jaws to swing said respective jaws about their respective axes,
(e) further fluid actuated cylinders interconnecting between adjacent jaws on said elongated tong bodies to swing said respective jaws about their respective axes,
  (1) a fluid actuated cylinder connected to one of said pivoted jaws and to said latch member associated therewith to actuate said latch member to connect said jaws together,
  (2) valving means to sequentially direct fluid to one end of each said fluid actuated cylinders to successively move said jaws and said latch members about the respective axes to close said jaws around the pipe and to latch said latch members so as to connect said jaws around the pipe, when in one position,
(f) power means to selectively move said elongated tong body of one of said tongs in arcuate relation about the axis of the pipe to rotate the pipe, and
(g) further valving means to selectively direct fluid into the opposite end of said fluid actuated cylinders to unlatch said latch members to disengage said jaws from the pipe.

4. An automated, power actuated tong arrangement for rotating pipe and the like, as defined in claim 3; wherein:
(a) said frame on which said tongs are mounted is a wheeled carriage,
(b) said wheeled carriage having an upstanding fluid cylinder mounted thereon and connected thereto for movement therewith,
  (1) a plunger mounted in said upstanding cylinder and forming a support for said tongs,
  (2) one of said tongs being a power actuated tong and the other of said tongs being a back-up tong,
(c) a mounting support,
  (1) a trackway mounted on said mounting support,
  (2) said wheeled carriage being mounted on said trackway for longitudinal movement therealong, and
(d) fluid actuated cylinder means associated with said wheeled carriage and said mounting support to move said wheeled carriage along said trackway.

5. An automated, power actuated tong arrangement for rotating pipe, as defined in claim 4; wherein:
(a) said plunger of said upstanding cylinder has pivot means thereon to pivotally mount said back-up tong with respect thereto for movement in a horizontal plane,
(b) a pair of arms mounted on said plunger of said upstanding cylinder a spaced lateral distance on each side of the elongated body of said back-up tong,
  (1) a spring associated with each said arm on each side of said elongated body of said back-up tong, and
  (2) adjusting means associated with each said arm and being in bearing relation with each said spring to resiliently position said elongated tong body therebetween.

6. A pipe wrenching assembly for power tongs comprising:
(a) a wheeled carriage,
(b) a first fluid cylinder operatively associated with said wheeled carriage, and being connected thereto for movement of said wheeled carriage along a horizontal path,
(c) a second fluid cylinder mounted on said wheeled carriage and extending upward therefrom,
  (1) a first upright support standard associated with said second fluid cylinder,
  (2) a first frame pivotally mounted on said first support standard and extending outward therefrom and forwardly thereof,
  (3) an arm pivotally mounted near the distal end of said first frame,
  (4) a tong associated with said arm and being movable in a horizontal plane,
(d) a second frame pivotally mounted on said first support standard and extending outwardly therefrom and forwardly thereof,
(e) a second tong associated with said second frame and being movable to a limited degree in a separate horizontal plane from said first tong,
(f) each said tong has an open end, which open ends are facing substantially forwardly,
(g) each said tong having a handle,
(h) a plurality of levers pivoted about upright axes associated with the distal end of each said tong,
  (1) two of said levers on each tong adapted to move in opposed relation,
  (2) pipe engaging dies on each of said opposed levers to selectively engage pipe,
(i) one lever of said plurality of levers being pivotally associated with one of said opposed levers to selectively engage another of said plurality of levers to enable said dies to be brought into gripping relation with the pipe when in one position, and
(j) fluid actuated cylinders associated with the respective levers on each tong for selectively engaging said dies on said levers with the pipe being acted upon when said cylinders are in predetermined positions.

7. A pipe wrenching assembly for power tongs, as defined in claim 6; wherein:
(a) a second upright standard is mounted on said wheeled carriage,
(b) a first arm connected to said first upright standard and extending outwardly therefrom toward said second upright standard,
  (1) a pair of arms pivotally mounted on vertical axes on said outwardly extending first arm, and
(c) a guide means mounted on each pivotally mounted arm near the distal end thereof and being engageable with said second upright standard, upon relative movement between said upright standards to maintain said first upright standard against rotation with respect to said second upright standard, so as to maintain said tongs in a predetermined relation with respect to the pipe upon which the tongs act.

8. A pipe wrenching assembly for power tongs, as defined in claim 7; wherein:
 (a) said guide means on said pair of arms, pivotally mounted on said first arm, are rollers, and
 (b) screw bolt means associated with said outwardly extending first arm and said pair of arms pivotally mounted thereon to adjust said rollers in rolling contact relation with said second upright standard.

9. A pipe tong for rotating pipe, comprising:
 (a) a handle,
 (b) a plurality of levers mounted on said handle near one end thereof, which levers are pivoted about axes parallel to the axis of the pipe,
  (1) at least two of said levers having pipe engaging dies mounted therein,
  (2) said levers mounting said dies being adapted to move in opposed relation,
  (3) other levers pivotally associated with said first mentioned levers and being adapted to latch in such manner as to encircle the pipe in one position and to disengage the pipe when in another position,
 (c) a fluid actuated cylinder associated with each of said levers mounted on said handle,
 (d) further fluid cylinders associated with each lever and with the lever to which it is pivoted, and
 (e) fluid pressure means connected with the respective fluid cylinders to selectively actuate the cylinders sequentially to close said levers to surround the pipe and engage the dies with the pipe when in one position and to selectively actuate the cylinders in inverse relation and to disengage the dies from the pipe and open the levers to permit removal of the pipe therefrom, when in another position.

10. An automated, power actuated tong for rotating pipe, which tong comprises:
 (a) a handle,
  (1) means pivotally mounting said handle in supported relation,
 (b) a first jaw pivotally mounted on said handle for movement about an upright axis,
  (1) a pipe engaging die fitted within said jaw,
 (c) a second jaw pivotally mounted on said handle for movement about an upright axis, and being a spaced distance from said first jaw,
  (1) a pipe engaging die fitted within said second jaw,
 (d) a third jaw pivotally mounted on said first jaw for movement about an upright axis,
  (1) a pipe engaging die fitted within said third jaw,
 (e) a first lever pivotally mounted on said second jaw for movement about an upright axis, and having outwardly extending teeth thereon,
 (f) a second lever pivotally mounted on said third jaw for movement about an upright axis, and having a tooth engaging member therein to complementally engage the teeth of said first lever,
 (g) a first air actuated cylinder-plunger assembly pivotally connected to said handle and to said first jaw in leverage relation for movement of said first jaw about said upright axis,
 (h) a second air actuated cylinder-plunger assembly pivotally connected to said handle and to said second jaw in leverage relation for movement of said second jaw about said upright axis,
 (i) a third air actuated cylinder-plunger assembly interconnecting said first jaw and said third jaw in leverage relation for movement of said second jaw about said upright axis,
 (j) a fourth fluid actuated cylinder-plunger assembly pivotally interconnecting said third jaw and said second lever in leverage relation to move said tooth engaging member about said upright axis on said second lever relative to the outstanding teeth on said first lever.

References Cited

UNITED STATES PATENTS

| | | | |
|---|---|---|---|
| 1,365,541 | 1/1921 | Rankin | 91—36 X |
| 2,000,221 | 5/1935 | Dawson | 81—57 |
| 2,426,779 | 9/1947 | MacDonald | 91—36 X |
| 2,615,681 | 10/1952 | True | 166—77.5 |
| 2,691,314 | 10/1954 | Stevens et al. | 81—52.4 |
| 2,871,743 | 2/1959 | Kelley | 81—53 |
| 3,316,783 | 5/1967 | Wilson | 81—54 |

JAMES L. JONES, JR., Primary Examiner

U.S. Cl. X.R.

81—57.35